US009871457B2

(12) United States Patent
Sakurai et al.

(10) Patent No.: US 9,871,457 B2
(45) Date of Patent: Jan. 16, 2018

(54) SWITCHING POWER SUPPLY DEVICE

(71) Applicant: Panasonic Intellectual Property Management Co., Ltd., Osaka (JP)

(72) Inventors: Tatsuya Sakurai, Osaka (JP); Takashi Saji, Shiga (JP); Yoshihisa Minami, Shiga (JP); Keita Kawabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/421,614

(22) Filed: Feb. 1, 2017

(65) Prior Publication Data

US 2017/0141690 A1 May 18, 2017

Related U.S. Application Data

(63) Continuation of application No. PCT/JP2015/004663, filed on Sep. 14, 2015.

(30) Foreign Application Priority Data

Oct. 14, 2014 (JP) ................................. 2014-209576

(51) Int. Cl.
*H02M 3/335* (2006.01)

(52) U.S. Cl.
CPC ............................... *H02M 3/33569* (2013.01)

(58) Field of Classification Search
CPC ............ H02M 3/335; H02M 3/3369; H02M 3/33507; H02M 3/33576; H02M 3/33592;
(Continued)

(56) References Cited

U.S. PATENT DOCUMENTS

| 4,751,580 A * | 6/1988 | Fitzgerald | ................ H04N 5/63 307/64 |
| 6,577,512 B2 * | 6/2003 | Tripathi | ............. H05B 33/0815 363/21.15 |

(Continued)

FOREIGN PATENT DOCUMENTS

JP          2012-178934        9/2012

OTHER PUBLICATIONS

International Search Report of PCT application No. PCT/JP2015/004663 dated Nov. 17, 2015.

*Primary Examiner* — Adolf Berhane
(74) *Attorney, Agent, or Firm* — McDermott Will & Emery LLP

(57) ABSTRACT

A switching power supply device of the present disclosure includes a device connection state detection circuit that detects a connection state in a load device connection terminal, in a power supply system having the load device connection terminal. The device connection state detection circuit includes a transformer, a switching element, a pulse generator, and a waveform detection circuit. The waveform detection circuit detects a voltage or a current generated at a connecting point between a primary winding wire of the transformer and the switching element in response to operation of a pulse signal. The waveform detection circuit compares the voltage or the current with a predetermined reference value, and outputs an output signal in response to a comparison result to an OFF terminal.

19 Claims, 20 Drawing Sheets

(58) Field of Classification Search
CPC .... H02M 3/33523; H02M 7/48; H02M 7/537;
H02M 3/28; H02M 3/315; H02M 3/3155;
H02M 3/325; H02M 7/757
USPC .. 363/20, 21.02, 21.04, 21.07, 21.12, 21.13,
363/21.14, 21.15, 21.17, 21.18, 95, 97,
363/131
See application file for complete search history.

(56) References Cited

U.S. PATENT DOCUMENTS

| | | | | |
|---|---|---|---|---|
| 9,496,795 | B2* | 11/2016 | Morota | H02M 3/33523 |
| 2004/0218410 | A1* | 11/2004 | Yamada | H02M 1/36 |
| | | | | 363/125 |
| 2007/0133239 | A1* | 6/2007 | Tanaka | H02M 3/337 |
| | | | | 363/65 |
| 2009/0180302 | A1* | 7/2009 | Kawabe | H02M 3/33523 |
| | | | | 363/21.01 |
| 2010/0008106 | A1* | 1/2010 | Kawabe | H02M 3/33507 |
| | | | | 363/21.01 |
| 2010/0039836 | A1* | 2/2010 | Gong | H02M 3/156 |
| | | | | 363/21.13 |
| 2010/0308733 | A1* | 12/2010 | Shao | H02M 1/4225 |
| | | | | 315/119 |
| 2010/0309690 | A1* | 12/2010 | Kawabe | H02M 3/33507 |
| | | | | 363/21.01 |
| 2014/0036549 | A1* | 2/2014 | Li | H02M 3/33507 |
| | | | | 363/21.12 |
| 2015/0349651 | A1* | 12/2015 | Morota | H02M 3/33523 |
| | | | | 363/21.15 |

* cited by examiner

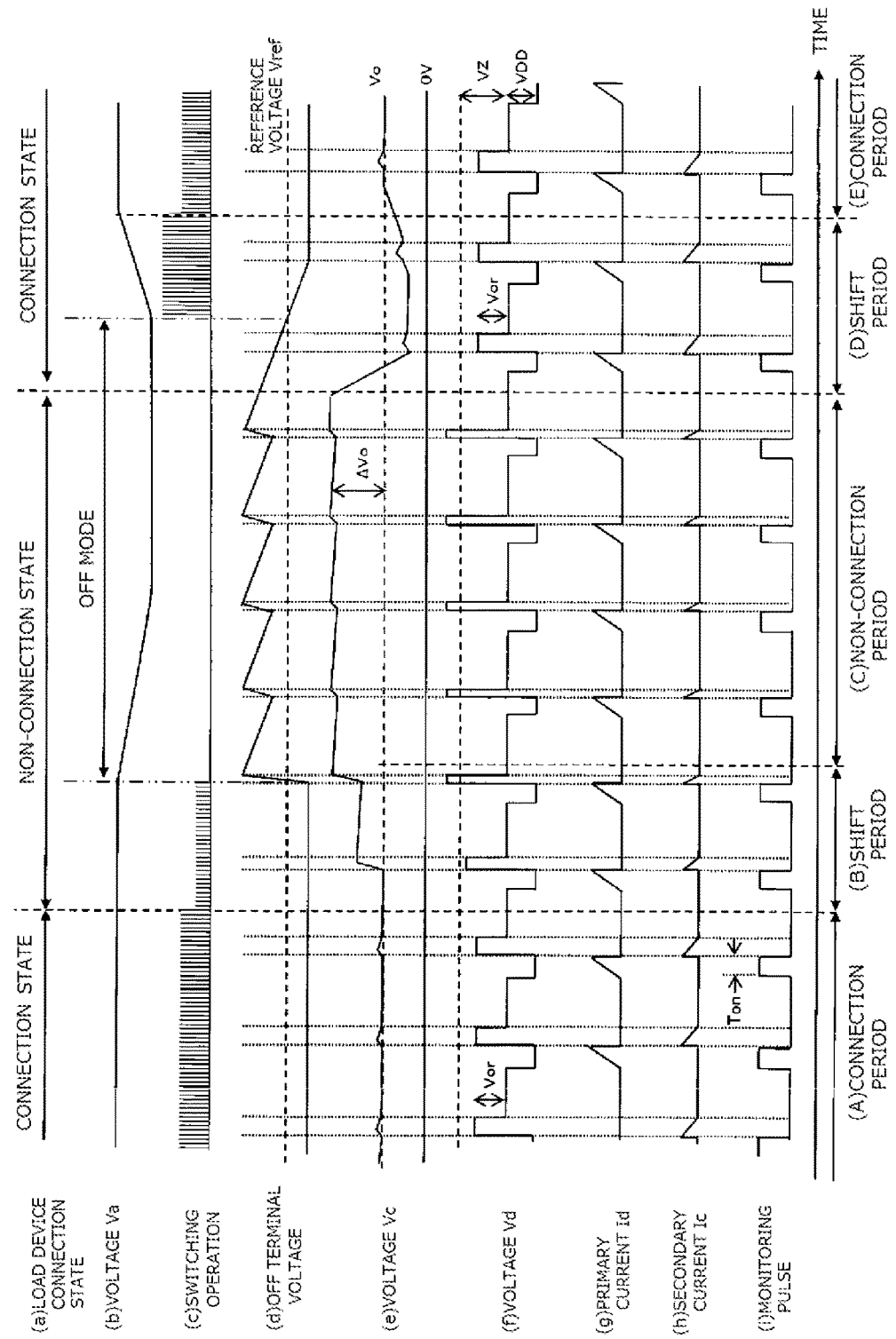

SWITCHING POWER SUPPLY DEVICE

RELATED APPLICATIONS

This application is a Continuation of International Application No. PCT/JP2015/004663, filed on Sep. 14, 2015, which in turn claims priority from Japanese Patent Application No. 2014-209576, filed on Oct. 14, 2014, the contents of all of which are incorporated herein by reference in their entireties.

BACKGROUND

1. Technical Field

The present disclosure relates to a switching power supply device that controls switching operation of a switching element with respect to an input voltage to control an output voltage.

2. Description of the Related Art

In recent years, energy problems have been noticed, and there is a strong demand on reduction in standby power of a power supply apparatus such as a switching power supply device. For example, a following system is proposed. The system is for lowering an output voltage to reduce power consumption, in a case where power supply from a switching power supply device is unnecessary, such as in a state where a load device is not connected in an AC adapter or in a state where operation of the load device is stopped.

In Unexamined Japanese Patent Publication No. 2012-178934, when a switching circuit causes a main switch to perform switching operation, a level of a ripple voltage superimposed on an output voltage of an AC adapter by energy supplied to a secondary side circuit through a transformer (main transformer) connected to a main switch is detected. Then, whether or not the AC adapter is in a connection state or a non-connection state with a portable computer is determined, and the output voltage is lowered, or a switching cycle is lengthened, so that power consumption is reduced

SUMMARY

A switching power supply device according to the present disclosure includes a first switching element, an output terminal, and an input/output conversion circuit. An input voltage is supplied to the first switching element. The output terminal is detachable from and reattachable to an input terminal of a load device. The input/output conversion circuit converts the input voltage switched by the first switching element into an output voltage to output the output voltage to the output terminal. The switching power supply device further includes a switching control circuit, a first rectifier circuit, a second rectifier circuit, a flyback transformer, a second switching element, a pulse generator, a waveform detection circuit, and a capacitive element. The switching control circuit controls switching operation of the first switching element, and has an OFF mode for stopping the switching operation in response to a signal input to an OFF terminal of the switching control circuit. The first rectifier circuit is connected between the input/output conversion circuit and the output terminal. The second rectifier circuit is connected to the output terminal. The flyback transformer has a secondary winding wire whose dot side terminal is connected to the second rectifier circuit. The second switching element is connected to a dot side terminal of a primary winding wire of the flyback transformer. The pulse generator supplies a pulse signal to a gate terminal of the second switching element. The waveform detection circuit is connected to a first connecting point being a connecting point between the dot side terminal of the primary winding wire of the flyback transformer and the second switching element, and detects a voltage or a current at the first connecting point to output a detection signal to the OFF terminal. The capacitive element is connected to a connecting point between the output terminal and the second rectifier circuit, and stores energy output from the secondary winding wire of the flyback transformer by a single switching of the second switching element. A capacitance value of the capacitive element is set such that the waveform detection circuit is capable of detecting a voltage value difference or a current value difference at the first connecting point by detachment and reattachment of the input terminal of the load device from and to the output terminal, the input terminal being connected to a discharge circuit.

According to the present disclosure, it is possible to reliably detect a connection state of the switching power supply device and the load device. Additionally, in a case of a non-connection state, switching operation of the switching power supply device is stopped, so that power consumption can be reduced.

BRIEF DESCRIPTION OF THE DRAWINGS

FIG. 6 is a timing chart illustrating operation of the switching power supply device according to the first exemplary embodiment;

DETAILED DESCRIPTION OF EMBODIMENT

Figure 1:
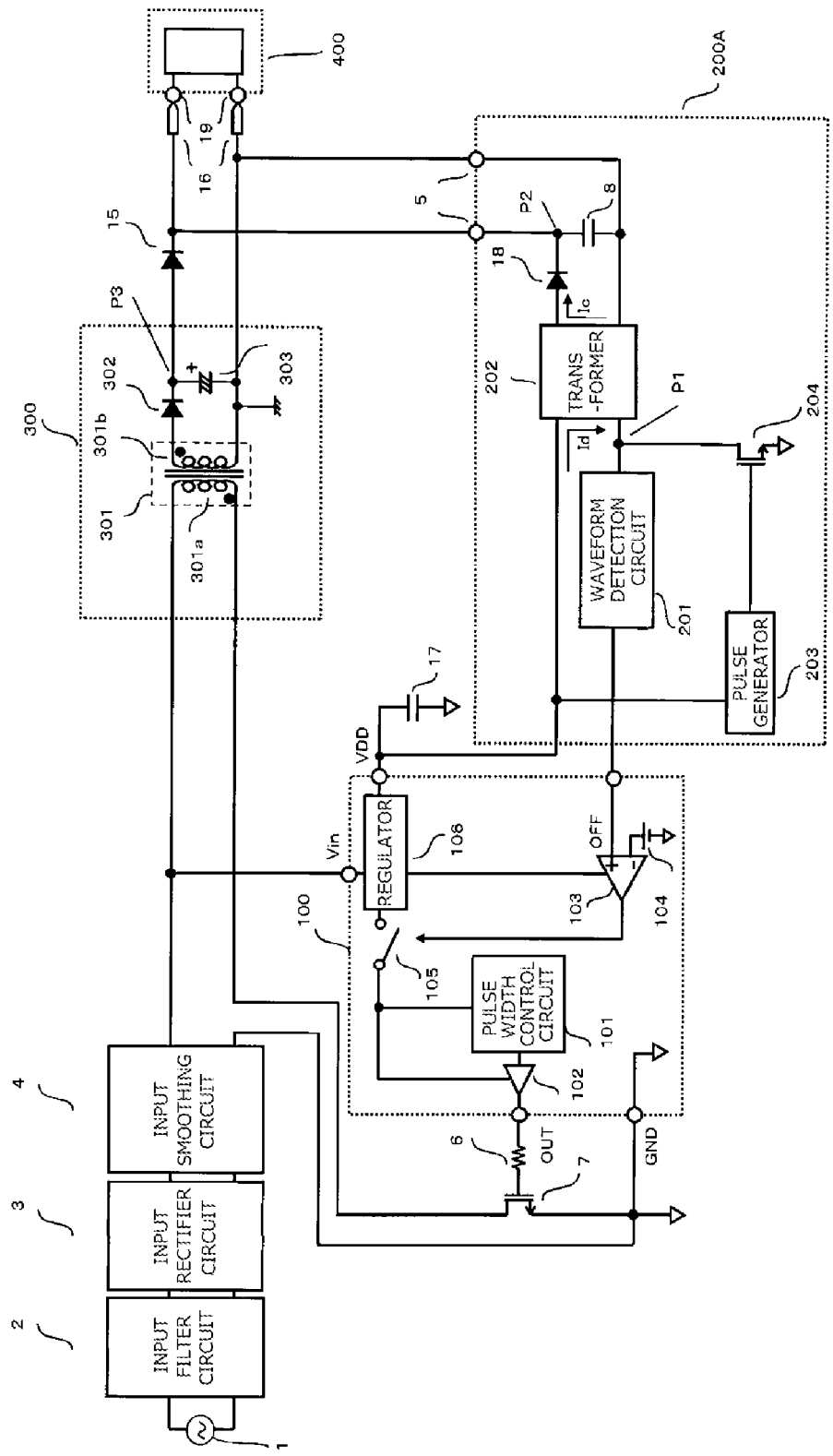
FIG. 1 is a circuit diagram illustrating a configuration example of a switching power supply device according to a first exemplary embodiment.

Prior to description of exemplary embodiments of the present disclosure, problems in the conventional technology are briefly described. In Unexamined Japanese Patent Publication No. 2012-178934, when an AC adapter is in a non-connection state with a portable computer, oscillation of a main switch cannot be stopped, and therefore there is a limit to further reduction of power consumption.

Additionally, a system devised by the inventors of the present disclosure utilizes whether or not energy, which is sent to an output side of a switching power supply device through a detection transformer separately provided from a main transformer provided in the switching power supply device, is stored in a capacitance provided on an input side of a load device connected to the switching power supply device. Then, whether the switching power supply device is in a connection state or a non-connection state with the load device is detected, and switching operation of the switching power supply device is stopped, so that power consumption is reduced. In this system, in a case where the detection transformer provided in the switching power supply device is a flyback transformer, whether the switching power supply device is in the connection state or the non-connection state is detected by magnitude of reflected voltage generated in a primary winding wire of the transformer. In a case of the non-connection state, the energy sent through the transformer is not charged in the capacitance provided in the load device, and therefore the reflected voltage becomes large. In a case of the connection state, the energy sent through the transformer is charged in the capacitance provided in the load device, and therefore the reflected voltage becomes small. A difference between these reflected voltages is detected, and whether the switching power supply device is in the connection state or the non-connection state with the load device is detected. Additionally, in a case where the transformer provided in the load device is a forward transformer, whether the switching power supply device is in the connection state or the non-connection state is detected by utilization of a difference of current flowing in the winding wire of the transformer. In the non-connection state, there is no capacitance provided in the load device that charges the energy sent through the transformer, and therefore the current flowing in the winding wire of the transformer becomes small. In the connection state, the energy sent through the transformer is charged in the capacitance provided in the load device, and therefore the current flowing in the winding wire of the transformer becomes large. The difference between the currents flowing in the transformer is detected, and whether the switching power supply device is in the connection state or the non-connection state with the load device is detected.

However, in the system using the detection transformer devised by the inventors of the present disclosure, when a capacitance value of the load device is small (e.g., about thousands pF), it is difficult to detect a difference between the reflected voltages in a case of the flyback transformer, and it is difficult to detect a difference between the currents flowing in the winding wire of the transformer in a case of the forward transformer. Therefore, there is a possibility that the connection state of the switching power supply device and the load device cannot be detected, and malfunction is caused.

The present disclosure solves the above problems, and provides a power supply system capable of stopping switching operation of a switching power supply device to greatly reduce power consumption when a switching power supply device and a load device are in a non-connection state, and further detecting whether the switching power supply device and the load device are in a connection state or a non-connection state even in a case where a capacitance value of capacitance provided in the load device is small.

In the present disclosure, "capacitive element" means not only a capacitor but also an element capable of storing electric charges generally. Additionally, "capacitance" includes not only electricity storage capacity in a capacitor, but also electricity storage capacity (parasitic capacitance) accompanying other element and the like, and a constitution having theses electricity storage capacity.

First Exemplary Embodiment

A switching power supply device of a first exemplary embodiment of the present disclosure is described.

FIG. 1 is a circuit diagram illustrating a configuration example of the switching power supply device according to the first exemplary embodiment.

In FIG. 1, an input AC (Alternating Current) voltage from commercial AC power supply 1 passes through input filter circuit 2, input rectifier circuit 3, input smoothing circuit 4 to be input as an input DC (Direct Current) voltage to input/output conversion circuit 300.

Input/output conversion circuit 300 is disposed in order to convert, into a desired output voltage, an input voltage that is input. For example, as illustrated in FIG. 1, input/output conversion circuit 300 includes transformer 301 for power conversion, diode 302, and smoothing capacitor 303, transformer 301 has primary winding wire 301a and secondary winding wire 301b, and polarities of primary winding wire 301a and secondary winding wire 301b are reverse. This switching power supply device is a flyback switching power supply device.

Switching element 7 is connected to primary winding wire 301a, and an OUT terminal output signal of switching control circuit 100 is input to a control electrode (gate) of switching element 7, so that ON-OFF switching control of switching element 7 is performed.

Switching control circuit 100 is a controller that controls switching element 7, and controls a conductive state and a non-conductive state of switching element 7 so as to make an output voltage constant, and has five terminals, i.e., a Vin terminal, a VDD terminal, a GND terminal, an OUT terminal, and an OFF terminal as external input/output terminal. As illustrated in FIG. 1, switching control circuit 100 includes, for example, pulse width control circuit 101, drive circuit 102, OFF-mode detector 103, reference voltage source 104, OFF-mode switch 105, regulator 106, and the like.

The Vin terminal is a starting terminal of switching control circuit 100, and power is supplied from a line to which an input DC voltage of the input smoothing circuit is output. The power input from the Vin terminal is input to regulator 106, to be supplied to a circuit inside switching control circuit 100 through regulator 106.

The GND terminal is connected to a low potential side of the input smoothing circuit, and serves as a voltage reference on a primary side.

The OUT terminal is a terminal connected to a gate of switching element 7 through resistor 6.

The VDD terminal is a power supply terminal of switching control circuit 100. Capacitor 17 is connected to the VDD terminal, and when the switching power supply device is activated, a charging current flows into capacitor 17 from the VDD terminal, and a voltage of capacitor 17 is increased. When the voltage of capacitor 17 is increased, regulator 106 performs control so as to make a voltage of the VDD terminal constant.

The OFF terminal is a terminal for receiving an OFF-mode signal output from device connection state detection circuit 200A, and switching an OFF mode and normal operation.

Output terminal 16 includes two terminals, i.e., a terminal for outputting an output voltage output from input/output conversion circuit 300, and a secondary GND terminal.

Device connection state detection circuit 200A is disposed in order to detect whether output terminal 16 and load device 400 are in a connection state or a non-connection state, and is connected to the VDD terminal, the OFF terminal, and a primary GND terminal, and output terminal 16 of switching control circuit 100. As illustrated in FIG. 1, device connection state detection circuit 200A includes, for example, load device connection terminal 5, waveform detection circuit 201, transformer 202, pulse generator 203, switching element 204, diode 18, and capacitor 8.

Figure 2:
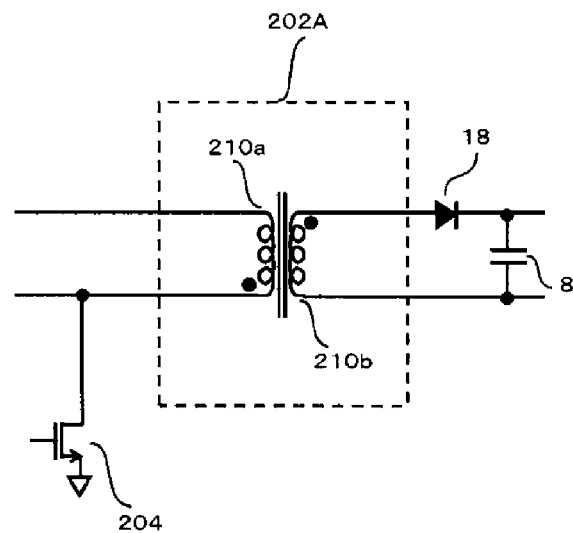
FIG. 2 is a circuit diagram illustrating a configuration example of a transformer according to the first exemplary embodiment.

For example, like transformer 202A of FIG. 2, transformer 202 has primary winding wire 210a and secondary winding wire 210b, and polarities of primary winding wire 210a and secondary winding wire 210b are reverse.

Transformer 202A is a flyback transformer. Dots attached to primary winding wire 210a and secondary winding wire 210b in FIG. 2 denote the respective polarities of the winding wires. In FIG. 2, the dots are added to an end of primary winding wire 210a connected to switching element 204, and an end of secondary winding wire 210b connected to an anode of diode 18.

Diode 18 has a rectification function of preventing energy stored in capacitor 8 and a load current flowing through diode 15 from flowing back to transformer 202.

Diode 15 has an anode connected to the input/output conversion circuit, and a cathode connected to output terminal 16, and prevents the energy stored in capacitor 8 from flowing back to smoothing capacitor 303.

Figure 3:
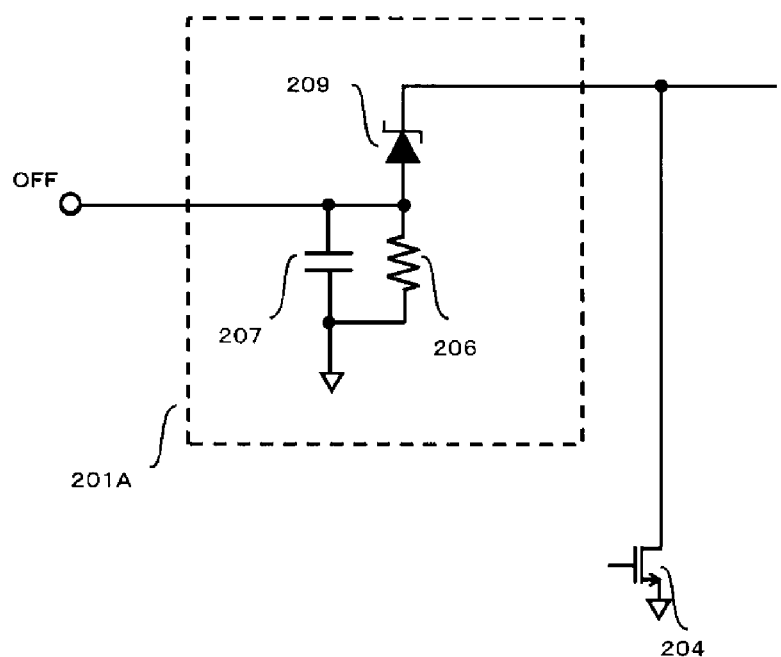
FIG. 3 is a circuit diagram illustrating a configuration example of a waveform detection circuit according to the first exemplary embodiment.

Waveform detection circuit 201 includes, for example, Zener diode 209, resistor 206, and capacitor 207, like waveform detection circuit 201A in FIG. 3.

Figure 4:
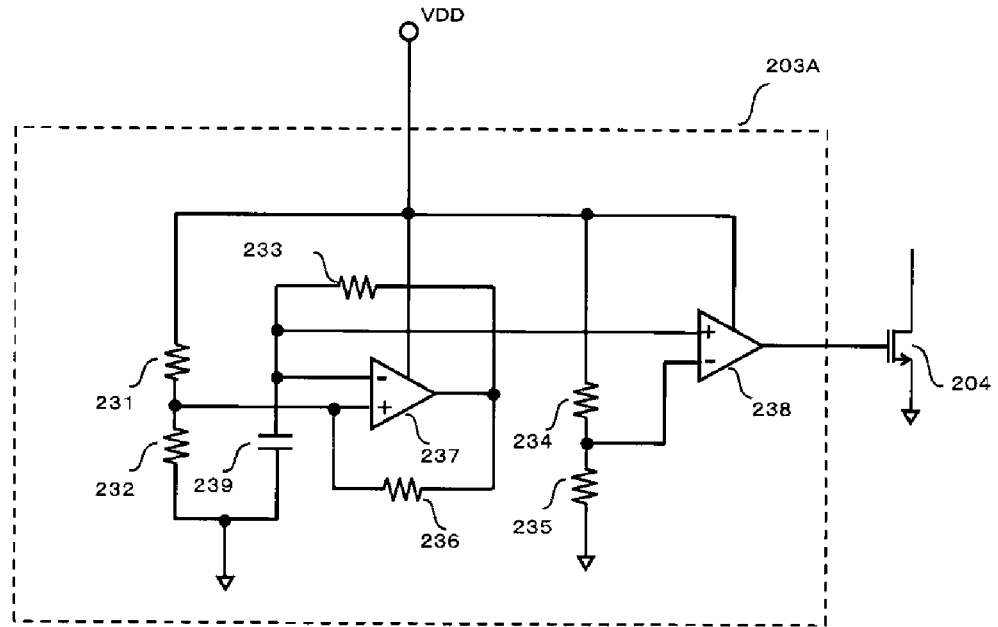
FIG. 4 is a circuit diagram illustrating a configuration example of a pulse generator according to the first exemplary embodiment.

Pulse generator 203 includes, for example, resistors 231, 232, 233, 234, 235, 236, capacitor 239, operational amplifier 237, and voltage comparator 238, like pulse generator 203A in FIG. 4. This circuit is a generally known pulse generating circuit, and therefore detailed description of operation is omitted.

Load device 400 is an electronic device such as a notebook computer and a tablet personal computer, and is detachable from and reattachable to output terminal 16.

Figure 5A:
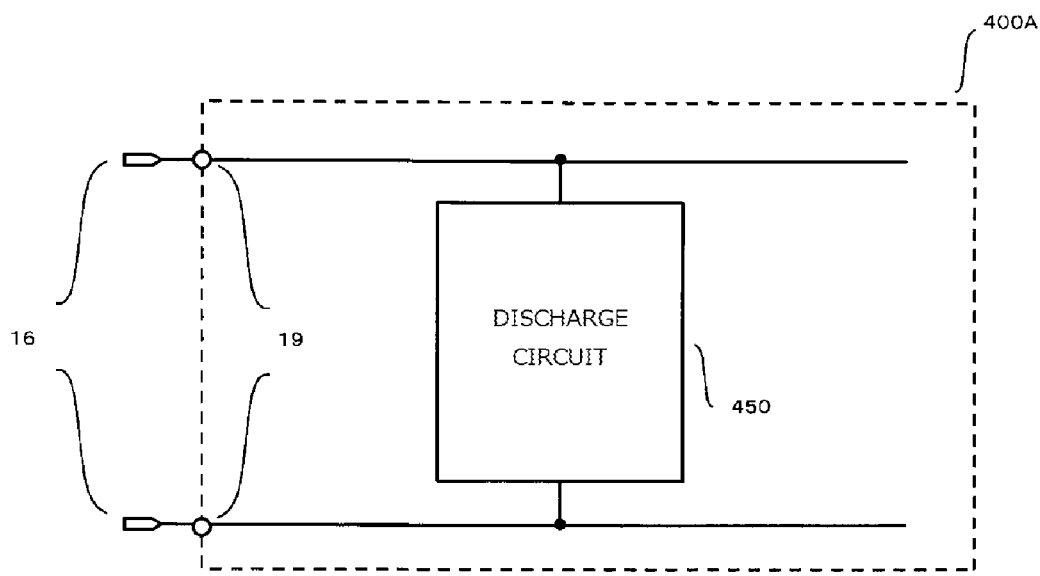
FIG. 5A is a circuit diagram illustrating a configuration example of a load device according to the first exemplary embodiment.

A vicinity of input of load device 400 includes, for example, input terminal 19, and discharge circuit 450, like 400A in FIG. 5A.

Figure 5B:
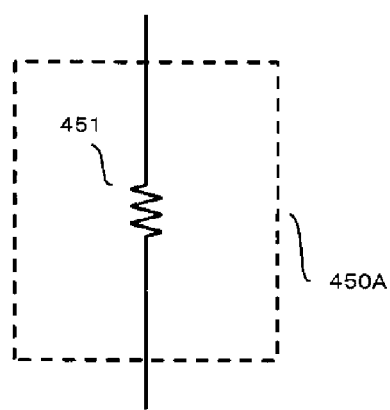
FIG. 5B is a circuit diagram illustrating a configuration example of the discharge circuit according to the first exemplary embodiment.

Discharge circuit 450 includes, for example, resistor 451, like discharge circuit 450A in FIG. 5B.

Operation of the switching power supply device illustrated in FIG. 1, which is configured as described above, is described.

When an AC voltage is input from commercial power supply 1 through input filter circuit 2, the AC voltage is rectified and smoothed by input rectifier circuit 3 and input smoothing circuit 4, to be converted into a DC voltage. A starting current is supplied to switching control circuit 100 from this DC voltage. When switching control circuit 100 is brought into an operable state, control for causing switching element 7 to switch is started, and power is supplied to load device 400 from input/output conversion circuit 300 through output terminal 16.

From the VDD terminal of switching control circuit 100, power is supplied to device connection state detection circuit 200A. When a current is supplied from the VDD terminal, pulse generator 203 outputs a monitoring pulse to a gate of switching element 204. When the monitoring pulse is input to the gate of switching element 204, switching element 204 is brought into a conductive state.

FIG. 6 is a timing chart illustrating operation of the switching power supply device in FIG. 1.

With reference to FIG. 6, a period of motion of each circuit in a connection state ((a) in FIG. 6) of the load device is divided into a period in which output terminal 16 and load device 400 are in the connection state (period (A) in FIG. 6), a period in which output terminal 16 and load device 400 are brought into a non-connection state to shift to an OFF mode (period (B) in FIG. 6), a period in which output terminal 16 and load device 400 are in the non-connection state (period (C) in FIG. 6), and a period in which output terminal 16 and load device 400 are brought into the connection state to return from the OFF mode ((D) in FIG. 6), and operation of the switching power supply device is described.

First, the period in which output terminal 16 and load device 400 are in the connection state (period (A) in FIG. 6) is described.

During period Ton in which a monitoring pulse ((i) in FIG. 6) is input to the gate of switching element 204, and switching element 204 is conductive, primary current Id ((g) in FIG. 6) flows in primary winding wire 210a. Then, during period Ton, exciting energy Ep is stored in primary winding wire 210a. Then, when switching element 204 is brought into a non-conductive state, energy Ep stored in primary winding wire 210a is transmitted to a secondary side through secondary winding wire 210b. At this time, secondary current Ic ((h) in FIG. 6) flows in secondary winding wire 210b. Capacitor 8 is charged with secondary current Ic through diode 18. When capacitor 8 is charged, voltage Vc ((e) in FIG. 6) at connecting point P2 in FIG. 1 is increased. Additionally, during a period in which current Ic flows in secondary winding wire 210b, reflected voltage Vor is generated in voltage Vd ((f) in FIG. 6) at connecting point P1 in FIG. 1. Then, increased voltage Vc is discharged by a leakage current inside the switching power supply device (e.g., a reverse current of diode 18 or a leakage current of capacitor 8).

At this time, when VDD denotes a voltage input to a non-dot side terminal of primary winding wire 210a, Np denotes a number of turns of primary winding wire 210a, Ns denotes a number of turns of secondary winding wire 210b, Vo denotes an output voltage between the terminals included in output terminal 16, ΔVo denotes a voltage increase of voltage Vc, and Vf denotes a forward voltage of diode 18, voltage Vc, voltage Vd, and reflected voltage Vor can be expressed by the following formulae.

$$Vd = VDD + Vor \quad (1)$$

$$Vor = Np/Ns \cdot (Vc + Vf) \quad (2)$$

$$Vc = Vo + \Delta Vo \quad (3)$$

When Zener diode 209 has Zener voltage Vz, Zener voltage VZ1 is set such that Vd<Vz is satisfied in a case where output terminal 16 and load device 400 are in the connection state, so that Zener current Iz does not flow in Zener diode 209. Therefore, voltage Voff ((d) in FIG. 6) of an OFF terminal is grounded to 0 V by resistor 206, and is maintained at an L level. When an OFF terminal voltage is maintained at the L level, switching control circuit 100 causes OFF-mode switch 105 to be in a conductive state, and therefore switching element 7 continues switching operation ((c) in FIG. 6), and voltage Va at connecting point P3 in FIG. 1 is held constant at Vo (for example, 19 V) ((b) in FIG. 6).

Resistor 451 of discharge circuit 450A is set so as to discharge electric charges larger than electric charges charged in capacitor 8 through transformer 202A when a previous pulse is input before a next monitoring pulse is input (for example, several hundreds kΩ).

Now, periods (periods (B) and (C) in FIG. 6) in which output terminal 16 and load device 400 are brought into the non-connection state and shift to an OFF mode is described.

When output terminal 16 and load device 400 are brought into the non-connection state, the electric charges charged in capacitor 8 through transformer 202A are not discharged by resistor 451 of discharge circuit 450A, and therefore voltage Vc at connecting point P2 in FIG. 1 is held. Then, each time when a monitoring pulse is input to switching element 204, capacitor 8 is charged, and voltage Vc at connecting point P2 in FIG. 1 is increased. In response to increase of voltage Vc at connecting point P2 in FIG. 1, reflected voltage Vor is increased. When reflected voltage Vor is increased, and Vd>VZ1 is satisfied, Zener diode 209 is conductive, and Zener current Iz flows. When Zener current Iz flows, capacitor 207 is charged, and OFF terminal voltage Voff is increased. When capacitor 207 is charged, electric charges are discharged by resistor 206. However, when resistor 206 is set such that electric charges are not completely discharged before next charging, OFF terminal voltage Voff is held at an H level. When OFF terminal voltage Voff becomes higher than reference voltage Vref1 of OFF-mode detector 103, switching control circuit 100 causes OFF-mode switch 105 to be in an interruption state, and therefore switching element 7 stops switching operation, voltage Va at connecting point P3 in FIG. 1 is lowered to 0 V, and power consumption of the switching power supply device is reduced.

Now, periods (periods (D) and (E) in FIG. 6) in which output terminal 16 and load device 400 are brought into the connection state and return from the OFF mode is described.

When output terminal 16 and load device 400 are brought into the connection state, the electric charges charged in capacitor 8 are discharged through resistor 451 of discharge circuit 450A, and therefore voltage Vc at connecting point P2 in FIG. 1 is lowered. When Vc is lowered, reflected voltage Vor is decreased. Therefore, when Vd<VZ1 is satisfied, Zener diode 209 is brought into a non-conductive state, and Zener current Iz does not flow. When Zener current Iz does not flow, capacitor 207 is not charged, and therefore electric charges are discharged by resistor 206, OFF terminal voltage Voff is lowered to 0 V, and the OFF terminal voltage is maintained at the L level. When the OFF terminal voltage is maintained at the L level, switching control circuit 100 causes OFF-mode switch 105 to be in the conductive state, and therefore switching element 7 starts switching operation, and voltage Va is increased.

Thus, in the switching power supply device of this exemplary embodiment, when the switching power supply device and the load device are in the non-connection state, the switching operation of switching power supply device is stopped and power consumption is greatly reduced. Furthermore, even in a case where a capacitance value of the capacitance provided in the load device is small, for example, several thousand pF, the resistor provided near the input terminal of load device 400 is used, so that the connection state of output terminal 16 and load device 400 can be accurately detected, and OFF mode control of the switching power supply device can be performed.

Figure 5C:
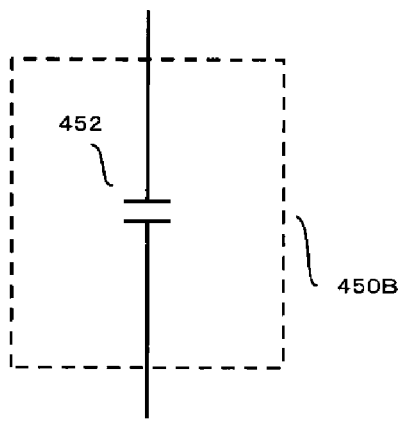
FIG. 5C is a circuit diagram illustrating a configuration example of the discharge circuit according to the first exemplary embodiment.

The discharge circuit may be capacitor 452 like discharge circuit 450B in FIG. 5C. This capacitor can be utilized also as a noise countermeasure element of load device 400. At this time, normal operation cannot be maintained only by capacitor 452. However, when a voltage is applied to the load device, a load current of the load device is generally increased, and therefore electric charges charged in capacitor 8 continue to be discharged.

Figure 5D:
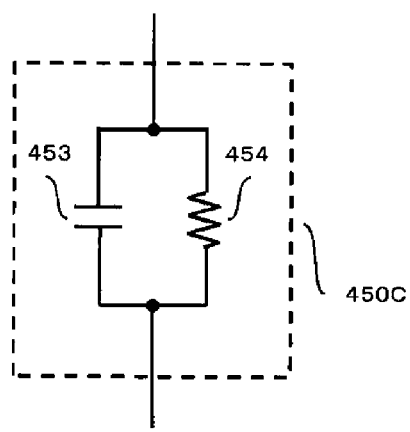
FIG. 5D is a circuit diagram illustrating a configuration example of the discharge circuit according to the first exemplary embodiment.

As the discharge circuit, capacitor 453 and resistor 454 may be connected in parallel, like discharge circuit 450C in FIG. 5D.

Figure 5E:
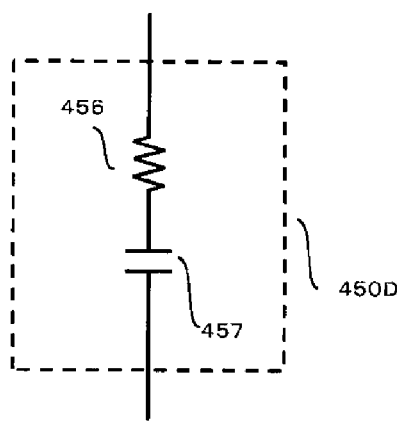
FIG. 5E is a circuit diagram illustrating a configuration example of the discharge circuit according to the first exemplary embodiment.

As the discharge circuit, capacitor 457 and resistor 456 may be connected in series, like discharge circuit 450D in FIG. 5E. Discharge circuit 450D can be utilized also as a snubber circuit that suppresses an overvoltage to load device 400.

The discharge circuit may have a circuit configuration in which FIG. 5B to FIG. 5E are combined.

Figure 5F:
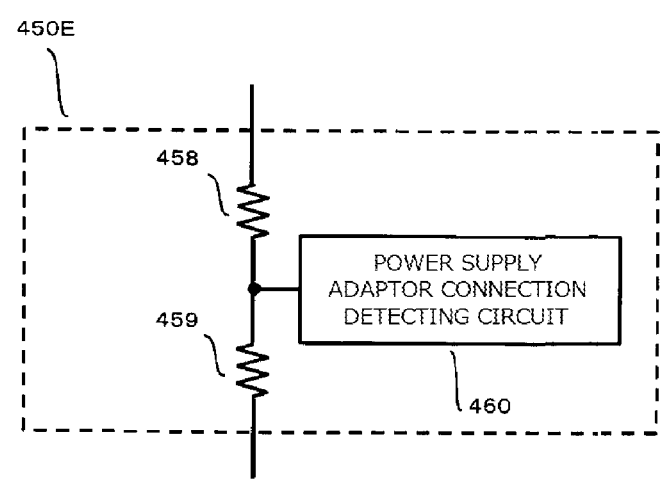
FIG. 5F is a circuit diagram illustrating a configuration example of the discharge circuit according to the first exemplary embodiment.

The discharge circuit may be a resistor for voltage detection of power supply adaptor connection detecting circuit 460, like resistors 458, 459 of discharge circuit 450E in FIG. 5F.

First Modification of First Exemplary Embodiment

A switching power supply device according to a first modification of the first exemplary embodiment is different from the switching power supply device according to the first exemplary embodiment in a configuration of a connection destination of load device connection terminal 5 of device connection state detection circuit 200A.

Figure 7:
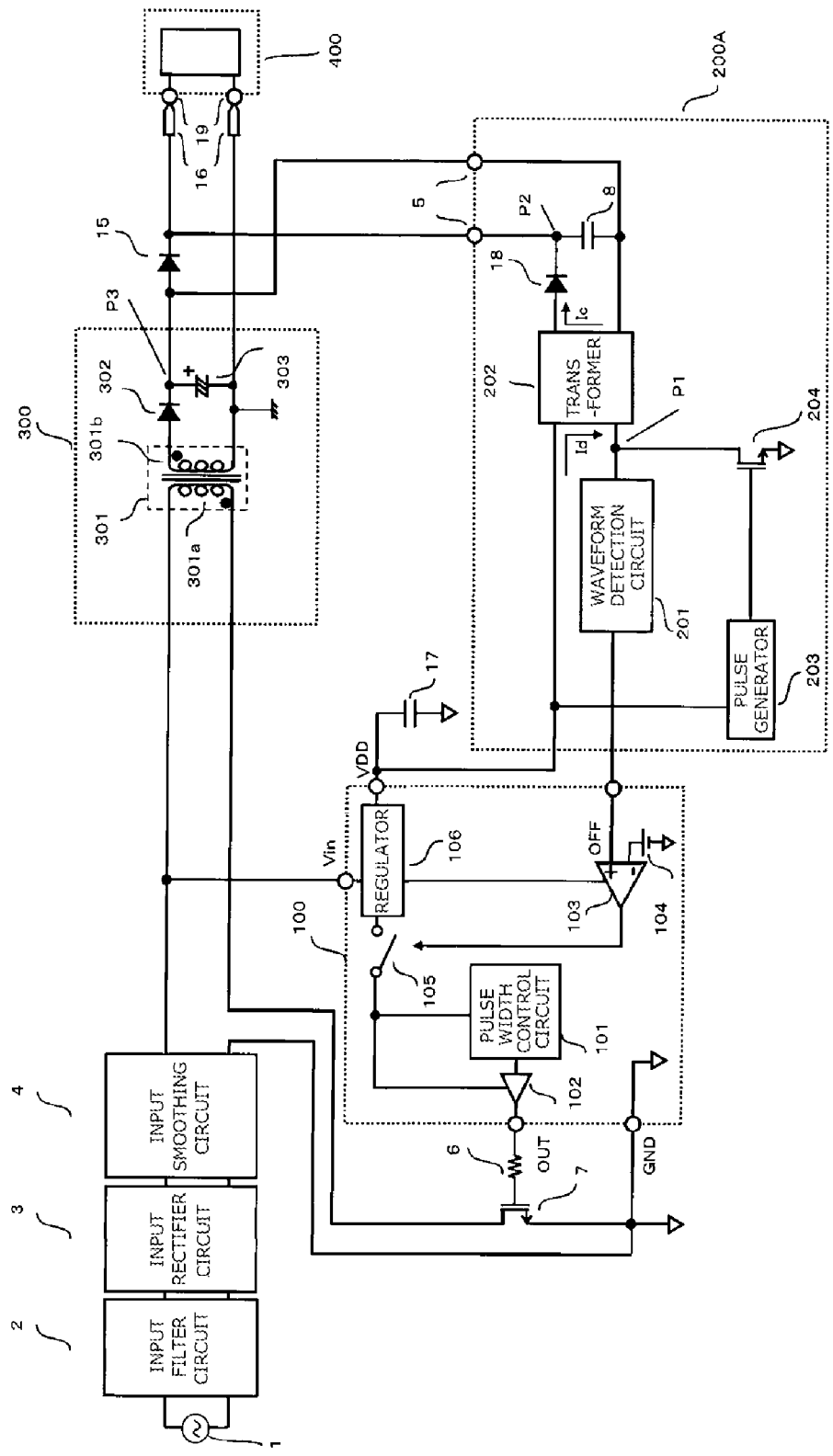
FIG. 7 is a circuit diagram illustrating a configuration example of a switching power supply device according to a first modification of the first exemplary embodiment.

FIG. 7 illustrates an example of the switching power supply device according to the first modification of the first exemplary embodiment.

Hereinafter, components identical with the components of the switching power supply device of the first exemplary embodiment illustrated in FIG. 1 are denoted by the same reference numerals, description of these components is omitted, and operation different from the operation of the first exemplary embodiment is mainly described.

In load device connection terminal 5 of device connection state detection circuit 200A, an end connected to a cathode of diode 18 is connected to a cathode side of diode 15, that is, connected to a connecting point with output terminal 16, and the other end of load device connection terminal 5 is connected to an anode side of diode 15. That is, device connection state detection circuit 200A is connected to both ends of diode 15, so that a potential difference (reverse voltage Vre) that appears in the both ends of diode 15 is detected.

Figure 8:
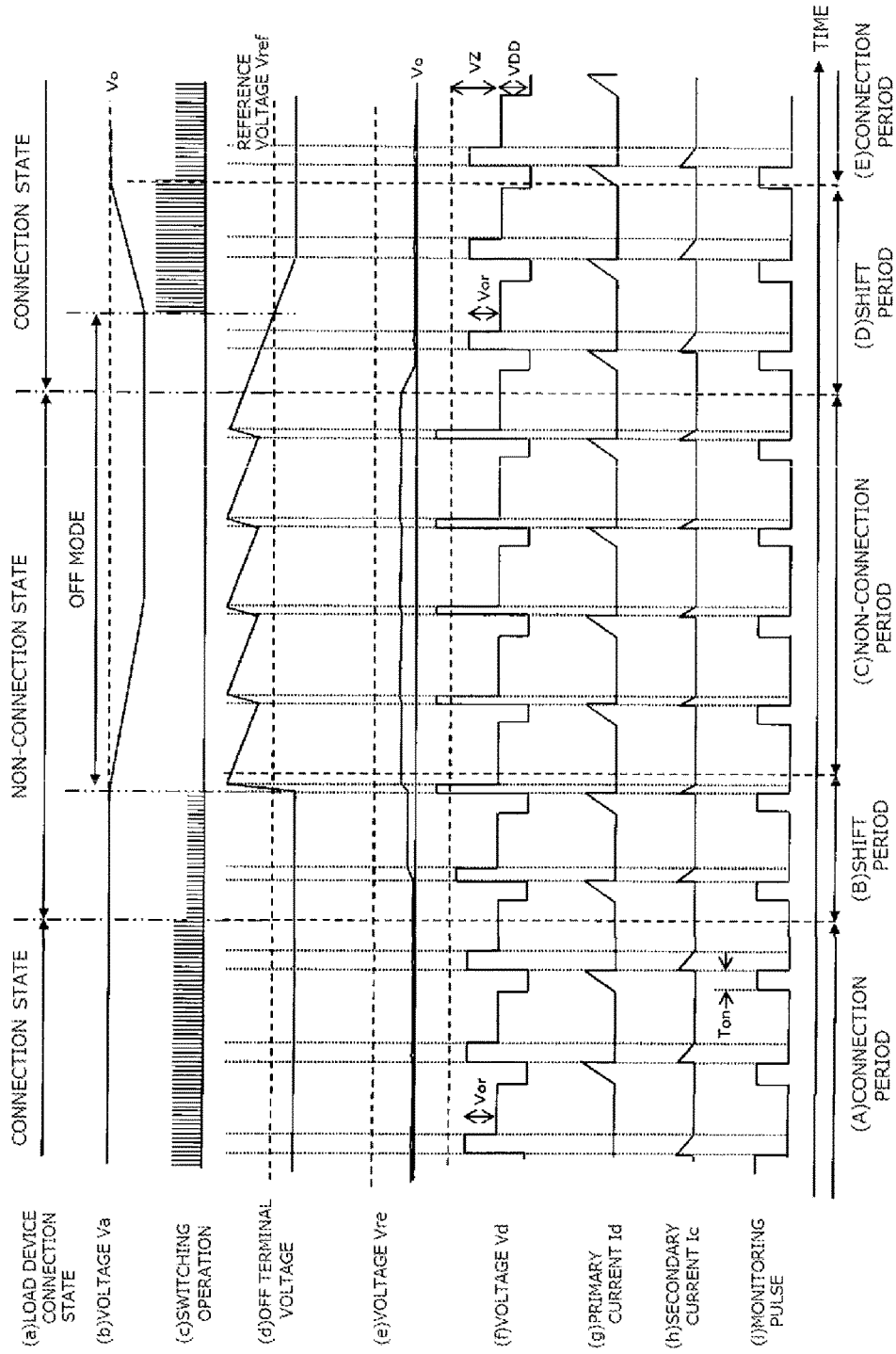
FIG. 8 is a timing chart illustrating operation of the switching power supply device according to the first modification of the first exemplary embodiment.

FIG. 8 is a timing chart illustrating operation of the switching power supply device according to the first modification of the first exemplary embodiment in FIG. 7. The timing chart of the first modification of the first exemplary embodiment is different from the timing chart of the first exemplary embodiment in FIG. 6 in that reverse voltage Vre of (e) in FIG. 7 is described in place of voltage Vc of (e) in FIG. 6.

Motion of each circuit in a connection state ((a) in FIG. 8) of a load device is described with reference to FIG. 8.

A period in which output terminal 16 and load device 400 are in a connection state is described (period (A) in FIG. 8).

During period Ton in which a monitoring pulse ((i) in FIG. 8) is input to a gate of switching element 204 and switching element 204 is conductive, primary current Id ((g) in FIG. 8) flows in primary winding wire 210a. Then, during period Ton, exciting energy Ep is stored in primary winding wire 210a. Then, when switching element 204 is brought into a non-conductive state, energy Ep stored in primary winding wire 210a is transmitted to a secondary side through secondary winding wire 210b. At this time, secondary current Ic ((h) in FIG. 8) flows in secondary winding wire 210b. Capacitor 8 is charged with secondary current Ic through diode 18. When capacitor 8 is charged, reverse voltage Vre ((e) in FIG. 8) at connecting point P2 in FIG. 7 is increased. Additionally, during a period in which current Ic flows in secondary winding wire 210b, reflected voltage Vor is generated in voltage Vd ((f) in FIG. 8) at connecting point P1 in FIG. 7.

At this time, voltage Vd is similarly expressed by Formula (1), and reflected voltage Vor is expressed by the following formula.

$$Vor = Np/Ns \cdot (Vre + Vf) \quad (4)$$

Formula (4) expresses difference from Formula (2) in the first exemplary embodiment. As shown in Formula (4), in the switching power supply device of the first modification of the first exemplary embodiment, reflected voltage Vor does not include a term of output voltage Vo.

When Zener voltage VZ1 (for example, 10 V) is set such that relation between voltage Vd and Zener voltage VZ1 of Zener diode 209 satisfies Vd<VZ1 in a case where output terminal 16 and load device 400 are in the connection state, Zener current Iz does not flow in Zener diode 209. Therefore, voltage Voff ((d) in FIG. 8) of an OFF terminal is grounded to 0 V by resistor 206, and is maintained at an L level. When an OFF terminal voltage is maintained at the L level, switching control circuit 100 causes OFF-mode switch 105 to be in a conductive state, and therefore switching element 7 continues switching operation ((c) in FIG. 8), and voltage Va at connecting point P3 in FIG. 7 is held constant at Vo ((b) in FIG. 8).

Now, periods (periods (B) and (C) in FIG. 8) in which output terminal 16 and load device 400 are brought into the non-connection state and shift to an OFF mode is described.

When output terminal 16 and load device 400 are brought into the non-connection state, electric charges charged in capacitor 8 through transformer 202A are not discharged by resistor 451 of discharge circuit 450A, and therefore reverse voltage Vre at connecting point P2 in FIG. 7 is held. Then, each time when a monitoring pulse is input to switching element 204, capacitor 8 is charged, and reverse voltage Vre at connecting point P2 in FIG. 7 is increased. In response to increase of reflected voltage Vor, reflected voltage Vor is increased. When reflected voltage Vor is increased, and Vd>VZ1 is satisfied, Zener diode 209 is conductive, and Zener current Iz flows. When Zener current Iz flows, capacitor 207 is charged, and OFF terminal voltage Voff is increased. When capacitor 207 is charged, electric charges are discharged by resistor 206. However, when resistor 206 is set such that electric charges are not completely discharged before next charging, OFF terminal voltage Voff is held at an H level. When OFF terminal voltage Voff becomes higher than reference voltage Vref1 (for example, 1 V) of OFF-mode detector 103, switching control circuit 100 causes OFF-mode switch 105 to be in an interruption state, and therefore switching element 7 stops switching operation, voltage Va at connecting point P3 in FIG. 7 is lowered to 0 V, and power consumption of the switching power supply device is reduced.

Now, periods (periods (D) and (E) in FIG. 8) in which output terminal 16 and load device 400 are brought into the connection state and return from the OFF mode is described.

When output terminal 16 and load device 400 are brought into the connection state, the electric charges charged in capacitor 8 are discharged through resistor 451 of discharge circuit 450A, and therefore reverse voltage Vre in FIG. 7 is lowered. When reverse voltage Vre is lowered, reflected voltage Vor is decreased. Therefore, when Vd<VZ1 is satisfied, Zener diode 209 is brought into a non-conductive state, and Zener current Iz does not flow.

When Zener current Iz does not flow, capacitor 207 is not charged, and therefore electric charges are discharged by resistor 206, OFF terminal voltage Voff is lowered to 0 V, and the OFF terminal voltage is maintained at the L level. When the OFF terminal voltage is maintained at the L level, switching control circuit 100 causes OFF-mode switch 105 to be in the conductive state, and therefore switching element 7 starts switching operation, and voltage Vo is increased.

Thus, the switching power supply device of this exemplary embodiment can obtain an effect similar to the effect of the first exemplary embodiment.

Furthermore, compared to the first exemplary embodiment, device connection state detection circuit 200A is not influenced by a voltage output from input/output conversion circuit 300, and therefore the connection state and the non-connection state of load device 400 can be more accurately detected.

Second Modification of First Exemplary Embodiment

A switching power supply device according to a second modification of the first exemplary embodiment is different from the switching power supply device according to the first exemplary embodiment in a configuration of load device 400.

Hereinafter, components identical with the components of the switching power supply device of the first exemplary embodiment illustrated in FIG. 1 are denoted by the same reference numerals, description of these components is omitted, and operation different from the operation of the first exemplary embodiment is mainly described.

Figure 9:
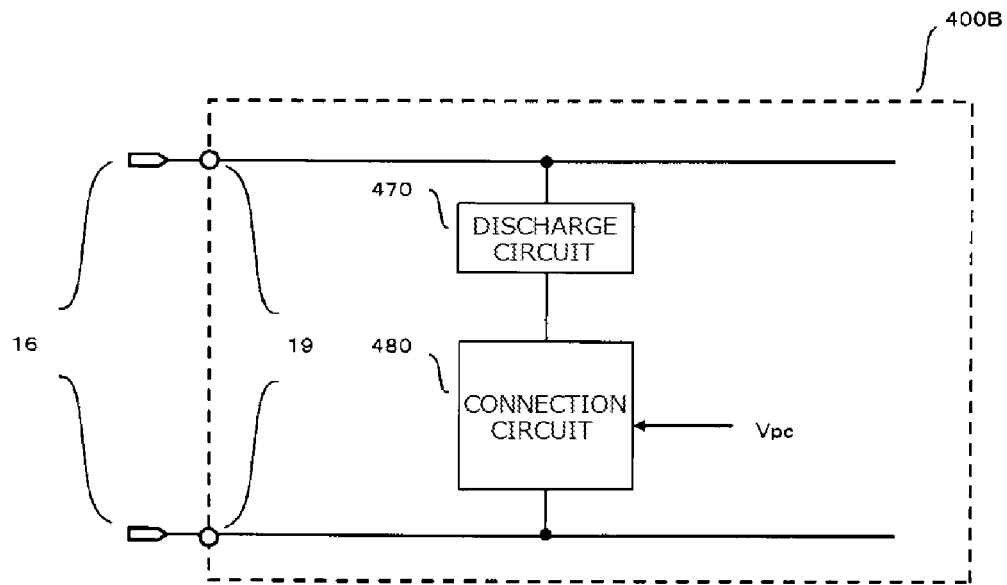
FIG. 9 is a circuit diagram illustrating a configuration example of a load device according to a second modification of the first exemplary embodiment.

FIG. 9 illustrates an example of load device 400B, which includes input terminal 19, discharge circuit 470, and connection circuit 480.

Discharge circuit 470 may have a circuit configuration of any of FIG. 5B to FIG. 5F, or a circuit configuration in which FIG. 5B to FIG. 5F are combined.

Figure 10:
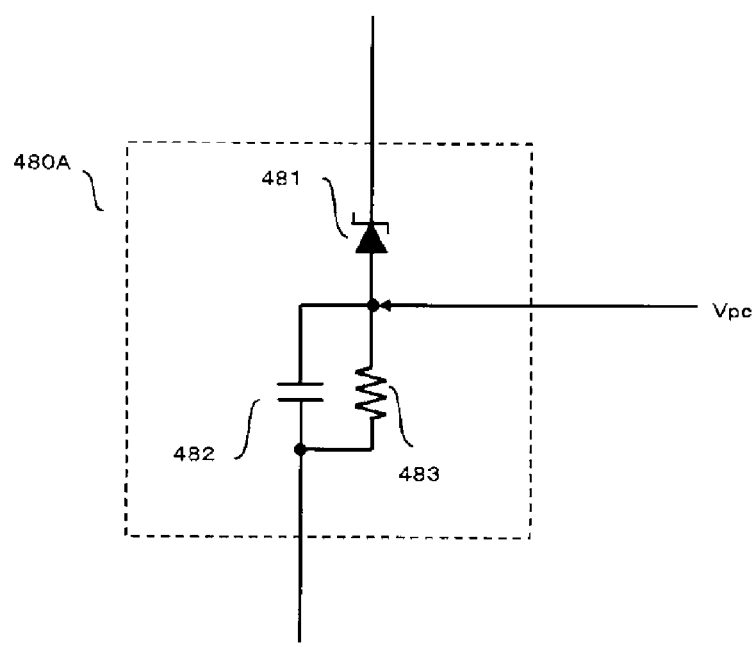
FIG. 10 is a circuit diagram illustrating a configuration example of a connection circuit according to the second modification of the first exemplary embodiment.

Connection circuit 480 includes, for example, Zener diode 481, capacitor 482, and resistor 483, like connection circuit 480A in FIG. 10.

During normal operation, voltage Vpc (for example, 15 V) is not applied as a switching power supply device OFF signal from an internal circuit of load device 400B. In a case where voltage Vout (for example, 23 V) between terminals included in output terminal 16 is larger than Zener voltage VZ2 (for example, 10 V) of Zener diode 481, Zener diode 481 is brought into a conductive state. At this time, discharge circuit 470 is connected to the other end of input terminal 19 through connection circuit 480.

In a case where Zener diode 481 is in a conductive state when output terminal 16 and load device 400B are in a connection state, operation of the switching power supply device show behavior similar to behavior in period (A) in FIG. 6.

When output terminal 16 and load device 400B are in the connection state, voltage Vpc is input. Then, when a difference between voltage Vout and voltage Vpc becomes smaller than Zener voltage VZ2, Zener diode 481 is brought into a non-conductive state, and discharge circuit 470 is cut off from one end of input terminal 19. At this time, electric charges charged in capacitor 8 through transformer 202A is not discharged by resistor 451 of discharge circuit 450A, and therefore device connection state detection circuit 200A detects a non-connection state, switching control circuit 100 causes OFF-mode switch 105 to be in an interruption state. Accordingly, switching element 7 stops switching operation, and shows behavior similar to behavior in period (C) in FIG. 6, and therefore power consumption of the switching power supply device is reduced.

This configuration can be applied to "peak shift" for shifting power consumption in a time zone when power demand is increased to other time zone, in order to effectively use power. For example, when the load device is a notebook computer, the switching power supply device is an AC adapter, the notebook computer causes the AC adapter to stop operation in a part of a time zone of daytime, and performs operation only by power supplied from a battery provided in the notebook computer, and the AC adapter is brought into an OFF mode, so that power consumption is reduced. During nighttime, the AC adapter is operated, the battery is charged, so that a time zone when power is consumed can be shifted.

Also, when this configuration is applied to the configuration of the first modification of the first exemplary embodiment, it is possible to obtain a similar effect.

Second Exemplary Embodiment

A switching power supply device according to a second exemplary embodiment is different from the switching power supply device according to the first exemplary embodiment in a configuration of device connection state detection circuit 200B, a connection destination of load device connection terminal 5, and a configuration of load device 400.

Figure 11:
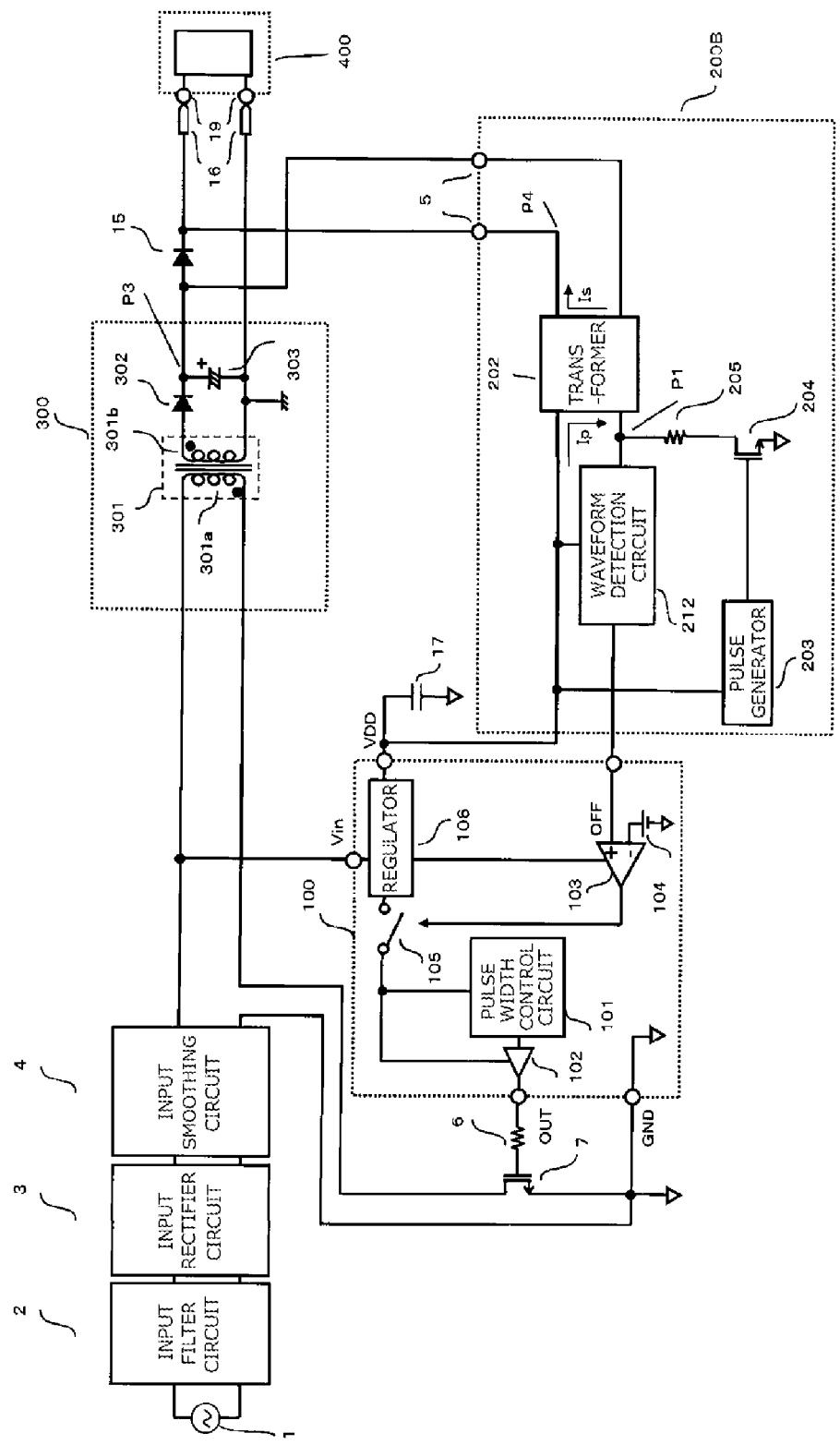
FIG. 11 is a circuit diagram illustrating a configuration example of a switching power supply device according to a second exemplary embodiment.

FIG. 11 illustrates an example of the switching power supply device according to the second exemplary embodiment.

As illustrated in FIG. 11, device connection state detection circuit 200B includes, for example, load device connection terminal 5, waveform detection circuit 212, transformer 202, pulse generator 203, switching element 204, and resistor 205.

Figure 12:
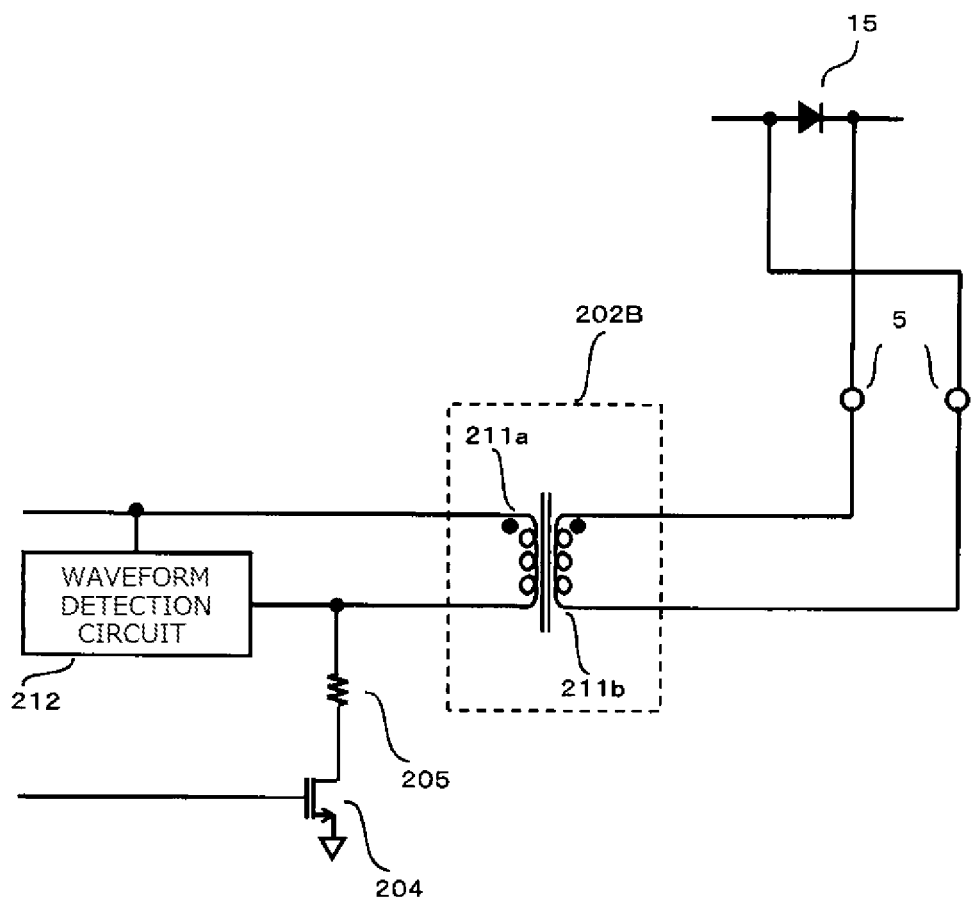
FIG. 12 is a circuit diagram illustrating a configuration example of a transformer according to the second exemplary embodiment.

For example, like transformer 202B of FIG. 12, transformer 202 has primary winding wire 211a and secondary winding wire 211b, and polarities of primary winding wire 211a and secondary winding wire 211b are reverse.

Transformer 202B is a forward transformer. Dots attached to primary winding wire 211a and secondary winding wire 211b of FIG. 12 denote the respective polarities of the winding wires. In FIG. 12, the dots are added to an end on an opposite side to primary winding wire 211a connected to resistor 205, and an end of secondary winding wire 211b connected to a cathode of diode 15 through load device connection terminal 5.

Figure 13:
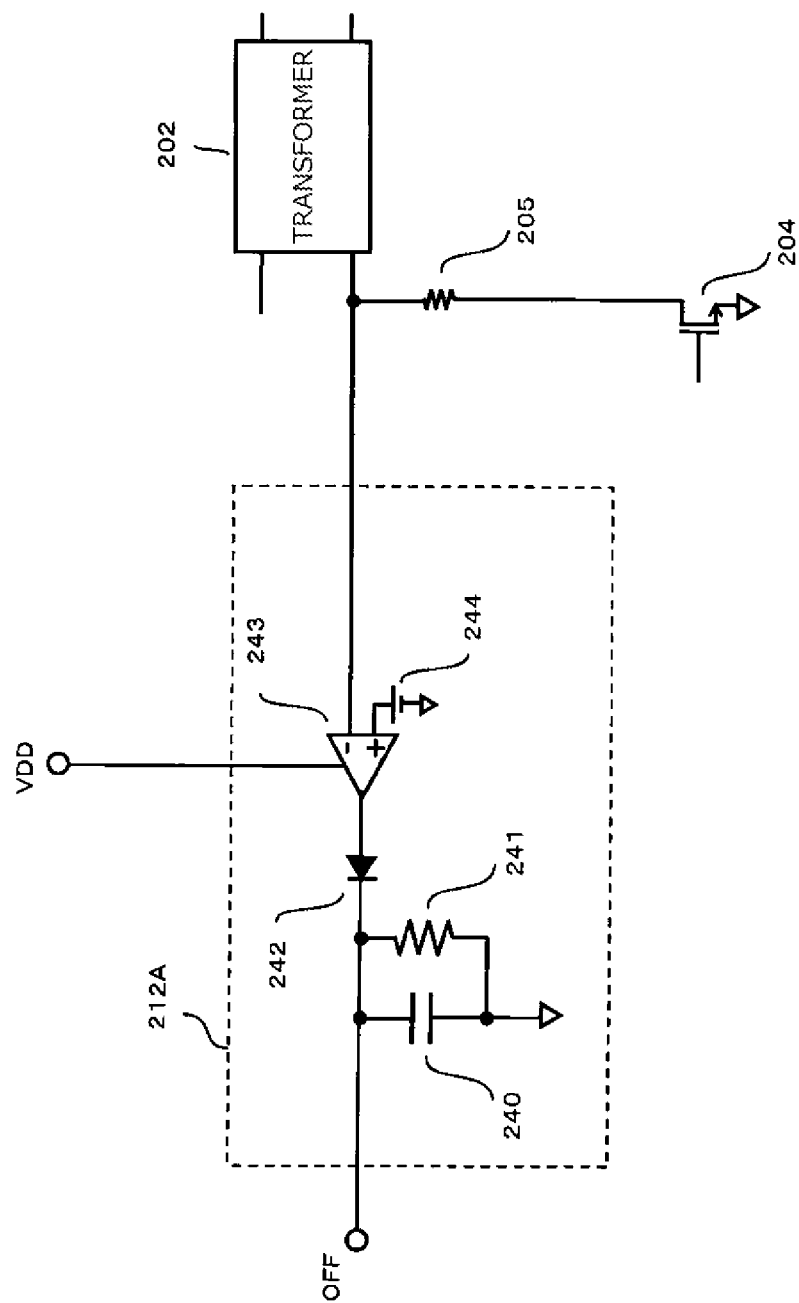
FIG. 13 is a circuit diagram illustrating a configuration example of a waveform detection circuit according to the second exemplary embodiment.

Waveform detection circuit 212 includes, for example, comparator 243, reference voltage source 244, diode 242, resistor 241, and capacitor 240, like waveform detection circuit 212A in FIG. 13.

Figure 14:
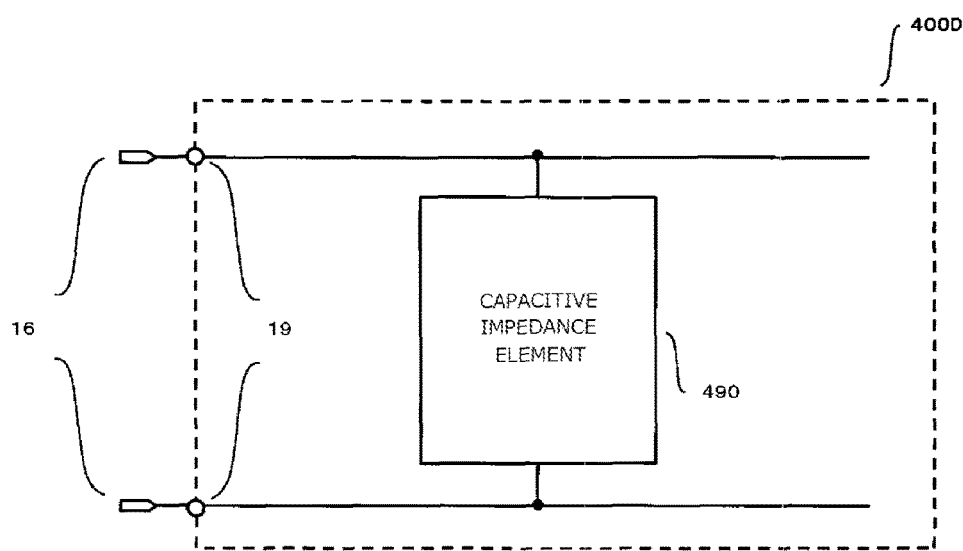
FIG. 14 is a circuit diagram illustrating a configuration example of a load device according to the second exemplary embodiment.

A vicinity of input of load device 400 includes, for example, input terminal 19, and capacitive impedance element 490, like 400D in FIG. 14.

Capacitive impedance element 490 includes, for example, capacitor 452 in FIG. 5C.

Hereinafter, components identical with the components of the switching power supply device of the first exemplary embodiment illustrated in FIG. 1 are denoted by the same reference numerals, description of these components is omitted, and operation different from the operation of the first exemplary embodiment is mainly described.

Figure 15:
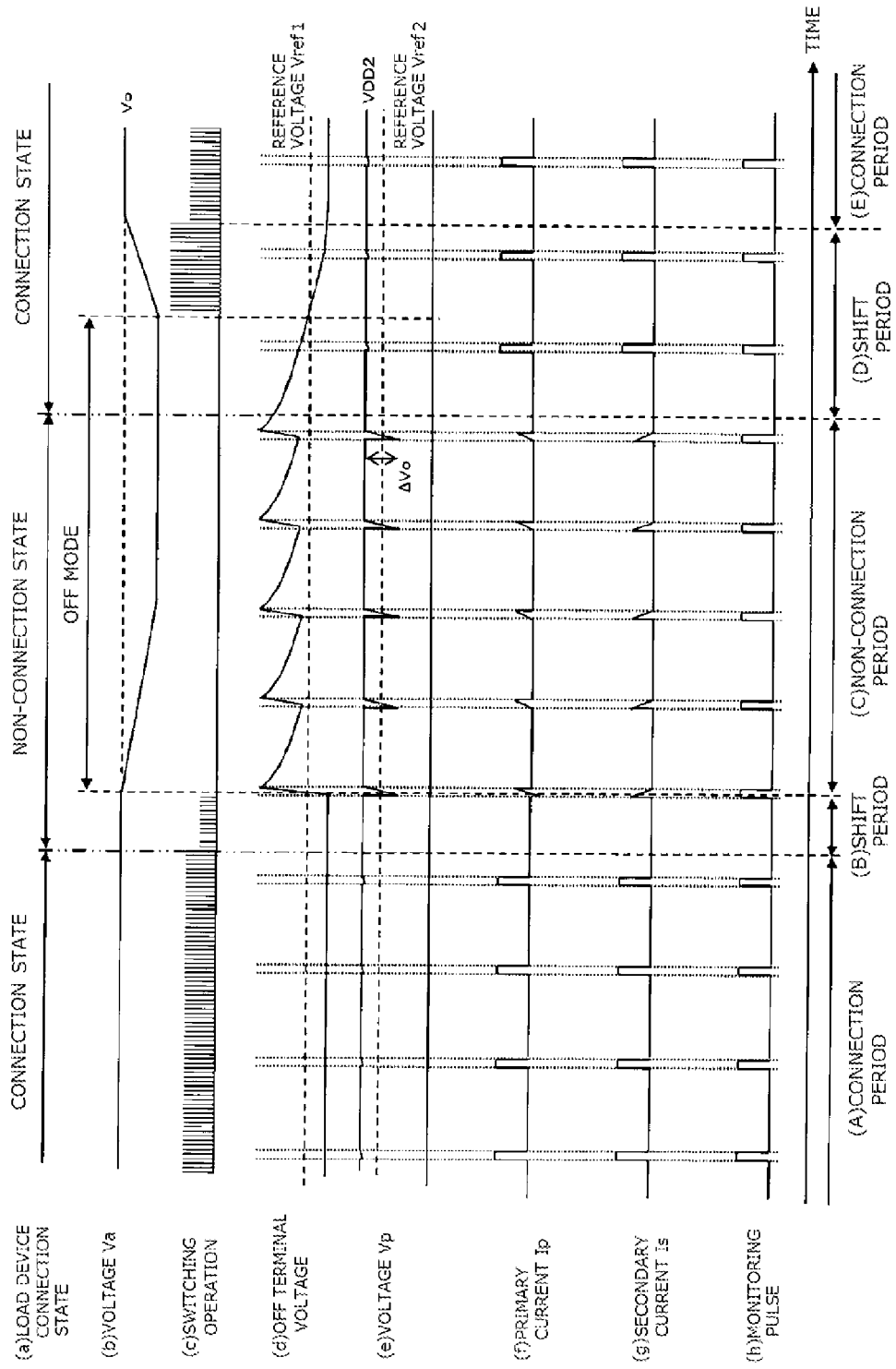
FIG. 15 is a timing chart illustrating operation of the switching power supply device according to the second exemplary embodiment.

FIG. 15 is a timing chart illustrating operation of the switching power supply device according to the second exemplary embodiment in FIG. 11.

Motion of each circuit in a connection state ((a) in FIG. 15) of the load device is described with reference to FIG. 15.

A period in which output terminal 16 and load device 400 are in a connection state is described (period (A) in FIG. 15).

When a monitoring pulse ((h) in FIG. 15) is applied, and switching element 204 is conductive, primary current Ip ((f) in FIG. 15) flows in primary winding wire 211a of transformer 202B, and secondary current Is ((g) in FIG. 15) flows through secondary winding wire 211b. At this time, primary current Ip is adjusted by resistor 205, and resistor 205 only needs to have, for example, about several hundreds Ω.

Parasitic capacitance (not illustrated) between terminals included in output terminal 16 is charged with secondary current Is. Furthermore, secondary current Is flows in load device 400D through output terminal 16, and capacitor 452 is charged with secondary current Is.

In a case where Cl denotes parasitic capacitance between the terminals included in output terminal 16, and Cpc denotes a capacitance value of capacitor 452, when a ratio of numbers of turns of primary winding wire 211a and secondary winding wire 211b of transformer 202B is equal, it can be equivalently regarded that when switching element 204 is conductive, capacitance (Cl+Cpc) is connected to both ends of primary winding wire 211a. When ΔVo denotes a voltage increased by capacitance (Cl+Cpc) charged with secondary current Is, and VDD denotes a voltage applied to primary winding wire 211a of transformer 202B, voltage Vp ((e) in FIG. 15) at connecting point P1 in FIG. 11 is obtained by VDD−ΔVo.

Capacitor 452 is charged with secondary current Is, and therefore increase of ΔVo becomes gentle. Therefore, drop of voltage Vp becomes gentle. When output terminal 16 and load device 400 are in a non-connection state, reference voltage Vref2 (for example, 1 V) of comparator 243 is set to be lower than voltage Vp, so that output of comparator 243 becomes an L level.

Electric charges in capacitor 240 are discharged by resistor 241, and therefore an OFF terminal voltage ((d) in FIG. 15) becomes an L level. When the OFF terminal voltage is maintained as the L level, switching control circuit 100 causes OFF-mode switch 105 to be in a conductive state, and therefore switching element 7 continues switching operation ((c) in FIG. 15), and voltage Va at connecting point P3 in FIG. 11 is held at Vo ((b) in FIG. 15).

Now, periods (periods (B) and (C) in FIG. 15) in which output terminal 16 and load device 400 are brought into a non-connection state and shift to an OFF mode is described.

When output terminal 16 and load device 400 are brought into the non-connection state, capacitance between terminals included in output terminal 16 is only parasitic capacitance Cl.

When switching element 204 is conductive, only parasitic capacitance Cl between the terminals included in output terminal 16 is charged with secondary current Is. Rise of voltage ΔVo increased by charging of parasitic capacitance Cl becomes sharp compared to a case where load device 400 is connected, and therefore fall of voltage Vp at connecting point P1 in FIG. 11 also becomes sharp.

As a result, only in a constant period, voltage Vp becomes lower than reference voltage Vref2 of comparator 243. When voltage Vp becomes lower than reference voltage Vref2 of comparator 243, output of comparator 243 becomes an H level. When the output of comparator 243 becomes the H level, a current flows from output of comparator 243 through diode 242, and capacitor 240 is charged.

When capacitor 240 is charged, and the voltage of the OFF terminal becomes larger than reference voltage Vref1 of OFF-mode detector 103, switching control circuit 100 brings OFF-mode switch 105 into a non-conductive state, and causes switching element 7 to stop switching operation. As a result, power consumption of the switching power supply device is reduced.

Now, periods (periods (D) and (E) in FIG. 15) in which output terminal 16 and load device 400 are brought into the connection state and return from the OFF mode is described.

When load device 400 is connected to output terminal 16, a capacitance value between the terminals included in output terminal 16 is capacitance (Cl+Cpc).

When switching element 204 is conductive, capacitance (Cl+Cpc) is charged with secondary current Is, and therefore rise of voltage ΔVo increased by charging with secondary current Is becomes gentle, and fall of voltage Vp at connecting point P1 in FIG. 11 becomes gentle. As a result, voltage Vp becomes higher than reference voltage Vref2 of comparator 243, and output of comparator 243 becomes an L level.

When the output of comparator 243 becomes the L level, capacitor 240 is not charged from comparator 243, and therefore electric charges in capacitor 240 are discharged through resistor 241, and the OFF terminal voltage is maintained at an L level.

As a result, switching control circuit 100 brings OFF-mode switch 105 into a conductive state, and causes switching element 7 to start switching operation.

Resistor 205 serves as an adjusting component for accurately detecting the connection state of output terminal 16 and load device 400. A resistance value of resistor 205 is adjusted, so that it is possible to adjust speed for charging parasitic capacitance Cl, and the capacitive impedance element of the load device. Consequently, it is possible to more definitely detect a difference between the connection state and the non-connection state of the switching power supply device and the load device.

Thus, in the switching power supply device of this exemplary embodiment, when the switching power supply device and the load device are in the non-connection state, the switching operation of switching power supply device is stopped and power consumption is greatly reduced. Furthermore, even in a case where a capacitance value of the capacitance provided in the load device is small, resistor 205 provided in device connection state detection circuit 200B is adjusted, so that the connection state of output terminal 16 and load device 400 can be detected, and OFF mode control of the switching power supply device can be performed.

Figure 18:
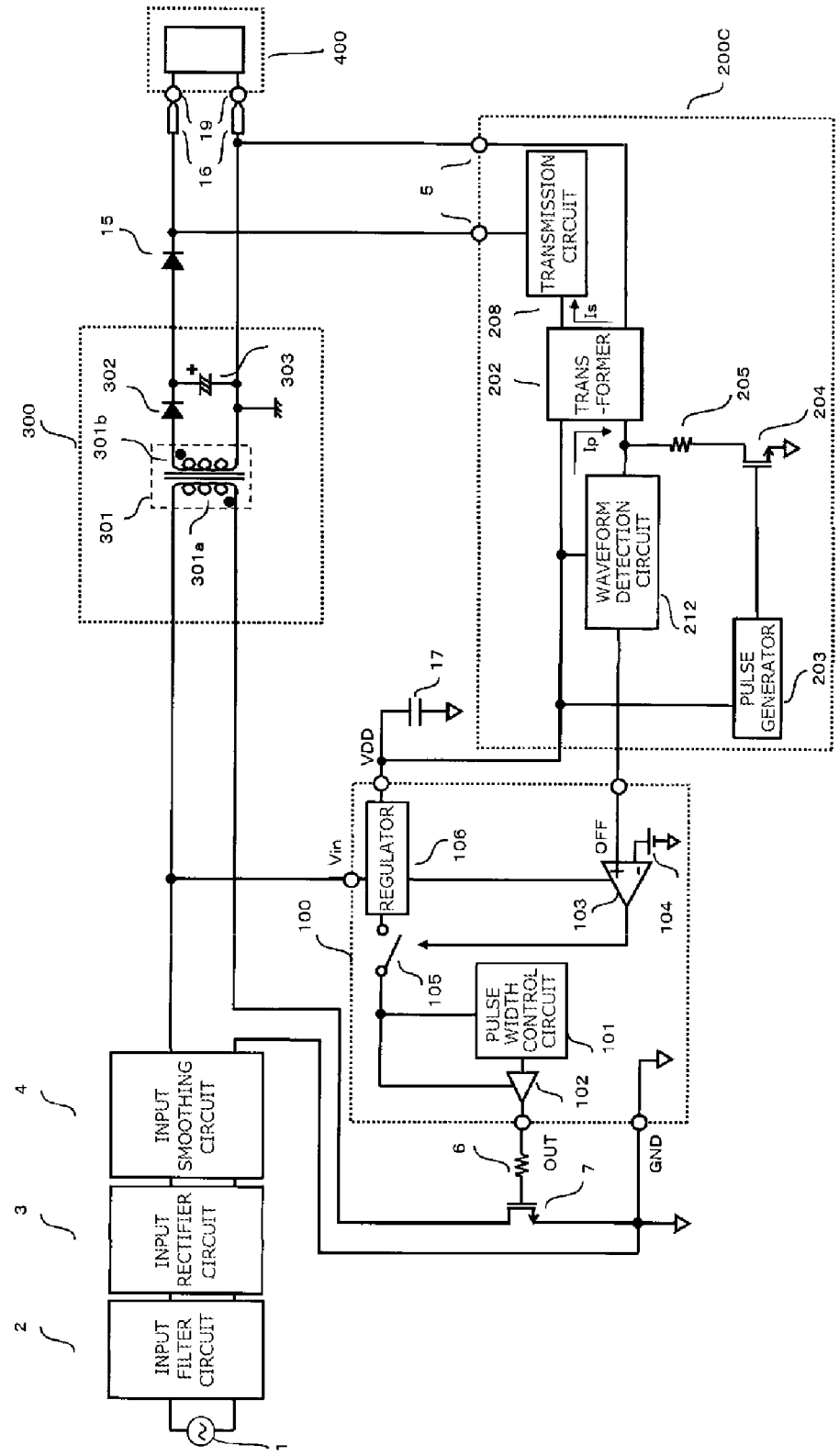
FIG. 18 is a circuit diagram illustrating a configuration example of the switching power supply device according to the first modification of the second exemplary embodiment.

Compared to the configuration example in FIG. 18, which is described in the first modification of the second exemplary embodiment, device connection state detection circuit 200B is not influenced by a voltage output from input/output conversion circuit 300, and therefore the connection state and the non-connection state of load device 400 can be more accurately detected.

Load device 400 is, for example, a notebook computer, and the notebook computer is generally provided with a capacitor having about several thousands pF to about several μF as an electromagnetic wave noise countermeasure, near an input terminal of the notebook computer. This capacitor is utilized, so that it is possible to detect the connection state of the load device and the switching power supply without addition of any component.

Capacitive impedance element 490 may have not only a configuration of FIG. 5C but also a configuration of FIG. 5D or FIG. 5E, and may be combination of the respective configurations.

First Modification of Second Exemplary Embodiment

A switching power supply device according to a first modification of the second exemplary embodiment is different from the switching power supply device according to the second exemplary embodiment in a configuration of device connection state detection circuit 200C.

Figure 16:
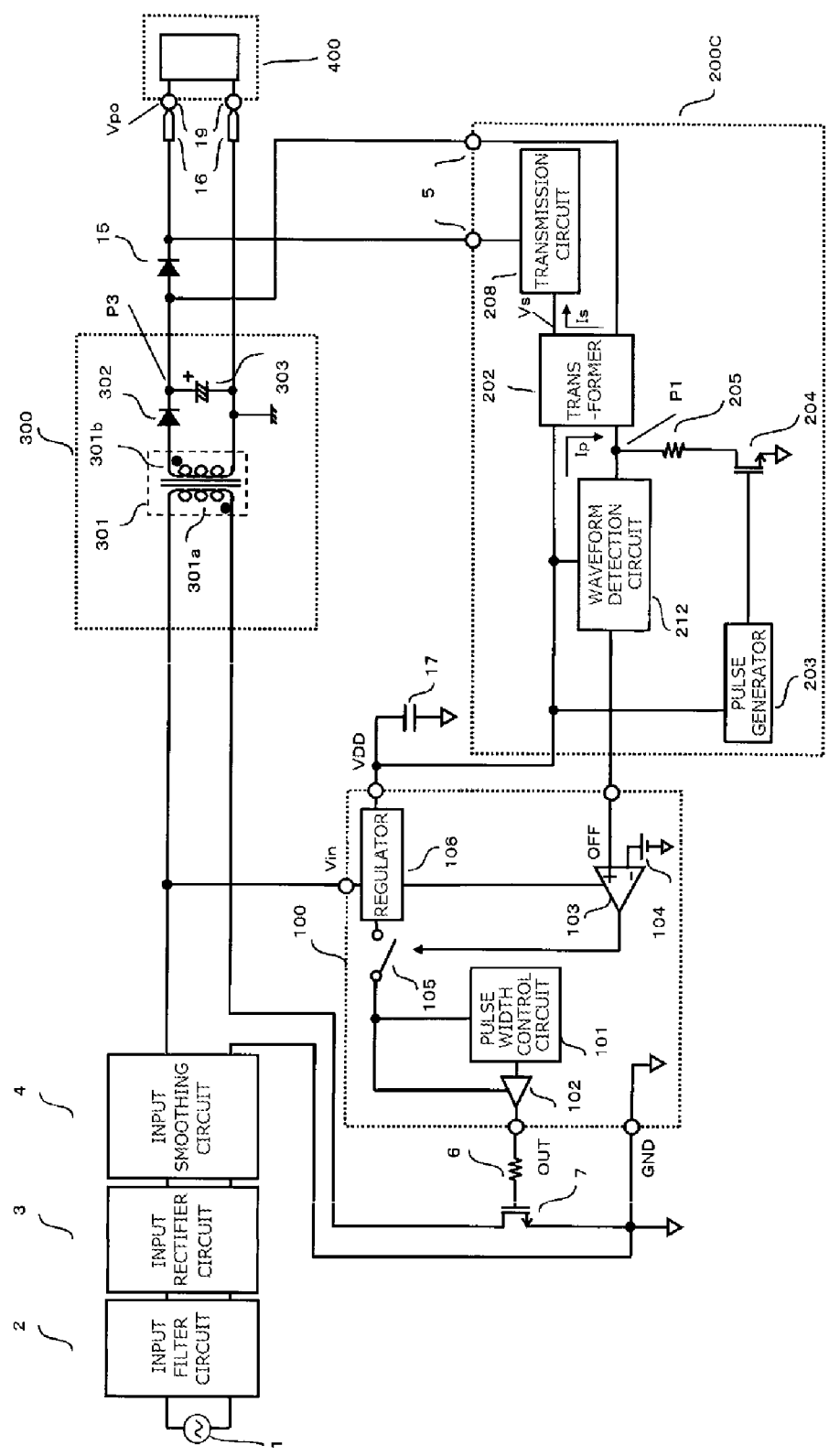
FIG. 16 is a circuit diagram illustrating a configuration example of a switching power supply device according to a first modification of the second exemplary embodiment.

FIG. 16 illustrates an example of the switching power supply device according to the first modification of the second exemplary embodiment.

Hereinafter, components identical with the components of the switching power supply device of the second exemplary embodiment illustrated in FIG. 11 are denoted by the same reference numerals, description of these components is omitted, and operation different from the operation of the second exemplary embodiment is mainly described.

Device connection state detection circuit 200C is different from device connection state detection circuit 200B in that device connection state detection circuit 200C is provided with transmission circuit 208.

Transmission circuit 208 has a rectification function of preventing a load current flowing through diode 15 from flowing back to transformer 202.

Figure 17A:
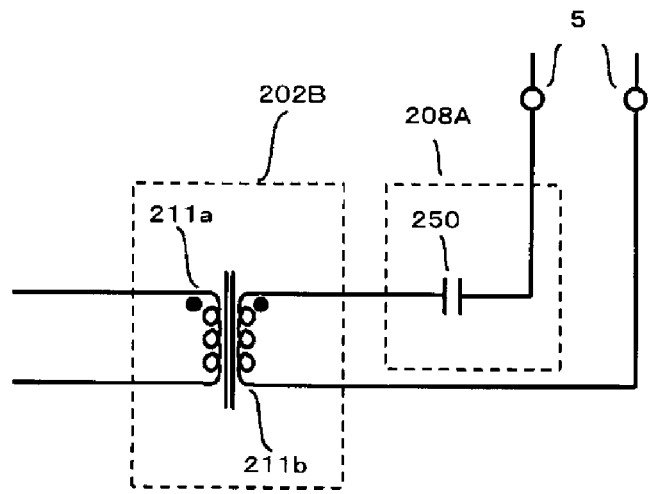
FIG. 17A is a circuit diagram illustrating a configuration example of a transmission circuit according to the first modification of the second exemplary embodiment.

Transmission circuit 208 includes, for example, capacitor 250, like transmission circuit 208A in FIG. 17A.

Capacitor 250 has an end which is connected to a dot side terminal of secondary winding wire 211b of transformer 202B, and the other end which is connected to a cathode terminal of diode 15 through load device connection terminal 5.

Operation of the switching power supply device of the first modification according to the second exemplary embodiment in FIG. 16 is similar to the operation illustrated in the timing chart in FIG. 15, and therefore the operation is described with reference to FIG. 15.

A period in which output terminal 16 and load device 400 are in a connection state is described (period (A) in FIG. 15).

When switching element 204 is brought into a conductive state, secondary current Is flows through secondary winding wire 211b. Secondary current Is is a pulse current, and therefore can be regarded as an AC current.

Capacitor 250 has a function of passing an AC current, and therefore secondary current Is flows through capacitor 250, and capacitance (Cl+Cpc) is charged with secondary current Is. At this time, a capacitance value of capacitor 250 only needs to be capacitance equal to or more than capacitance (Cl+Cpc). Capacitance (Cl+Cpc) is charged with secondary current Is, and therefore voltage drop ΔVo at connecting point P1 in FIG. 16 becomes gentle ((e) in FIG. 15), and device connection state detection circuit 200C detects that output terminal 16 and load device 400 are in a connection state.

A period in which output terminal 16 and load device 400 are in a non-connection state is described.

When switching element 204 is brought into a conductive state, parasitic capacitance Cl is charged with secondary current Is through capacitor 250, and therefore voltage drop ΔVo at connecting point P1 in FIG. 16 becomes sharp, and device connection state detection circuit 200C detects that output terminal 16 and load device 400 are in the non-connection state.

Now, a period in which output terminal 16 and load device 400 shift from the non-connection state to the connection state when voltage Vpo higher than secondary voltage Vs generated between secondary winding wire 211b of transformer 202B remains in an input terminal of load device 400 (period (B) in FIG. 15) is described.

When output terminal 16 and load device 400 are connected to each other, voltage Vpo is applied to an end connected to load device connection terminal 5 of capacitor 250, but capacitor 250 does not allow a DC current to pass, and therefore a reverse current does not flow from the input terminal of load device 400 to secondary winding wire 211b through capacitor 250.

Secondary current Is is an AC component, and therefore flows in the capacitance (Cl+Cpc) through capacitor 250. Accordingly, voltage drop ΔVo at connecting point P1 in FIG. 16 becomes gentle, and device connection state detection circuit 200C detects that output terminal 16 and load device 400 are in the connection state.

According to this configuration, even when output terminal 16 and load device 400 are connected in a state where the voltage higher than the voltage generated in secondary winding wire 211b remains in input terminal 19 of load device 400, it is possible to reliably detect the connection state.

Figure 17B:
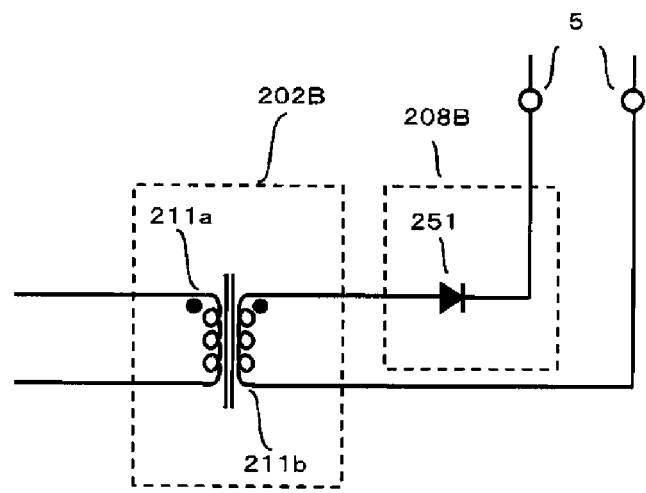
FIG. 17B is a circuit diagram illustrating a configuration example of the transmission circuit according to the first modification of the second exemplary embodiment.

Transmission circuit 208 may include, for example, diode 251, like transmission circuit 208B in FIG. 17B.

When transmission circuit 208 is provided, even in the configuration in which the dot side terminal of secondary winding wire 211b of transformer 202B is connected to the other end of output terminal 16 as illustrated in FIG. 18, a similar effect can be obtained.

Second Modification of Second Exemplary Embodiment

A switching power supply device according to a second modification of the second exemplary embodiment is different from the switching power supply device according to the second exemplary embodiment in a configuration of load device 400.

Hereinafter, components identical with the components of the switching power supply device of the second exemplary embodiment illustrated in FIG. 11 are denoted by the same reference numerals, description of these components is omitted, and operation different from the operation of the second exemplary embodiment is mainly described.

Figure 19:
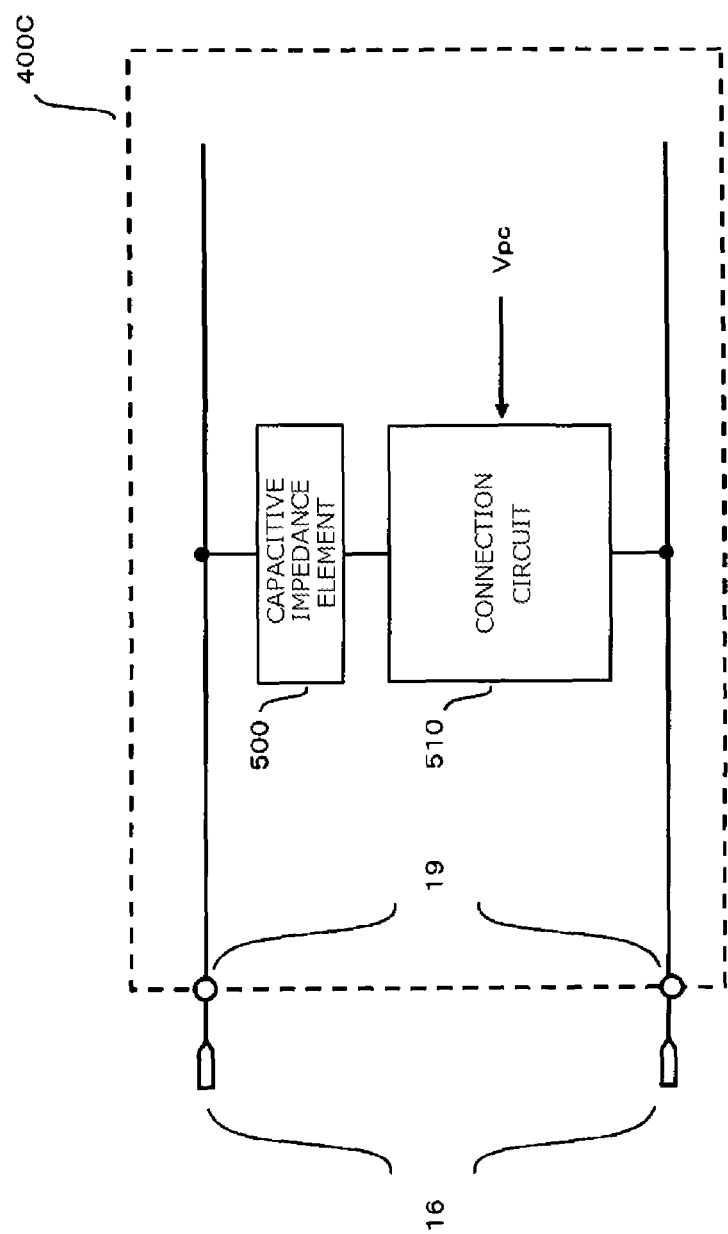
FIG. 19 is a circuit diagram illustrating a configuration example of a load device according to a second modification of the second exemplary embodiment.

FIG. 19 illustrates an example of load device 400C, which includes input terminal 19, capacitive impedance element 500, and connection circuit 510.

Capacitive impedance element 500 may have a circuit configuration of any of FIG. 5C to FIG. 5E, or a circuit configuration in which FIG. 5C to FIG. 5E are combined.

Figure 20:
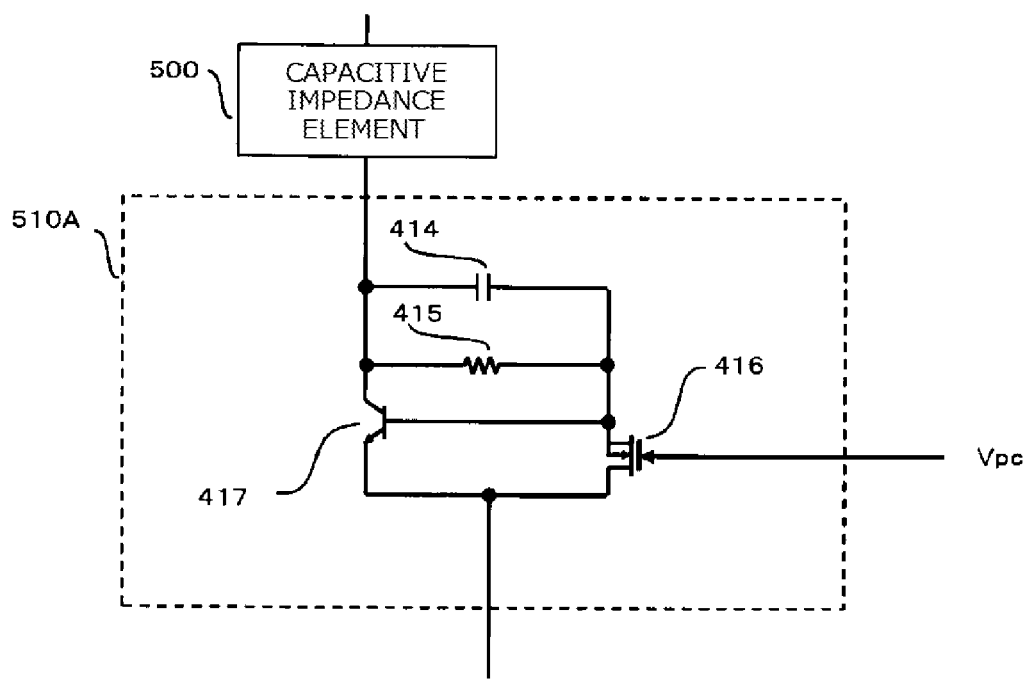
FIG. 20 is a circuit diagram illustrating a configuration example of a connection circuit according to the second modification of the second exemplary embodiment.

Connection circuit 510 includes, for example, capacitor 414, resistor 415, Nch MOS 416, and NPN transistor 417, like connection circuit 510A in FIG. 20.

A capacitance value of capacitor 414 is desirably a capacitance value sufficiently smaller than a capacitance value of capacitive impedance element 500, for example, several tens pF Hereinafter, operation of connection circuit 510A is described.

When output terminal 16 and input terminal 19 are in a connection state, secondary current Is flows in capacitive impedance element 500 through input terminal 19. Capacitive impedance element 500 is regarded as a capacitor, and therefore secondary current Is of an AC current component passes through capacitive impedance element 500, and one part of secondary current Is further passes through capacitor 414 to flow to a base terminal of NPN transistor 417. When the one part of secondary current Is further flows to the base terminal of NPN transistor 417, NPN transistor 417 is instantly brought into a conductive state, and secondary current Is flows in NPN transistor 417. At this time, the one part of secondary current Is flows to the base terminal of NPN transistor 417 through resistor 415, and therefore NPN transistor 417 continues to be in the conductive state. As a result, it can be regarded that capacitive impedance element 500 is connected between terminals included in input terminal 19, and therefore operation of the switching power supply device shows behavior similar to behavior in period (A) in FIG. 15.

When switching power supply device OFF signal Vpc is input to a gate of Nch MOS 416, and Nch MOS 416 is brought into a conductive state, NPN transistor 417 is brought into a non-conductive state, and it can be regarded that an end of capacitor 414 is connected to an end of input terminal 19.

As a result, it can be regarded that capacitive impedance element 500 and capacitor 414 are connected in series. At this time, a capacitance value of capacitor 414 is set to be sufficiently smaller than a capacitance value of capacitive impedance element 500, and therefore a synthetic capacitance value of capacitive impedance element 500 and capacitor 414 becomes a value close to the capacitance value of capacitor 414.

The capacitance value of capacitor 414 is sufficiently smaller than parasitic capacitance Cl of output terminal 16 and capacitance value Cpc of capacitive impedance element 500, and therefore even when output terminal 16 and input terminal 19 are in the connection state, device connection state detection circuit 200B detects that output terminal 16 and input terminal 19 are in the non-connection state, and switching control circuit 100 causes OFF-mode switch 105 to be in an interruption state. Accordingly, switching element 7 stops switching operation, and power consumption of the switching power supply device is reduced.

This configuration can be applied to "peak shift" similarly to the second modification of the first exemplary embodiment.

In the switching power supply device of the present disclosure, when the switching power supply device and the load device are in the non-connection state, switching operation of the switching power supply device is stopped, and power consumption is further reduced. Additionally, even in a case where a capacitance value provided near the input terminal of the load device is small, it is possible to detect the connection state of the switching power supply device and the load device.

What is claimed is:

1. A switching power supply device comprising:
   a first switching element to which an input voltage is supplied;
   an output terminal detachable from and reattachable to an input terminal of a load device;
   an input/output conversion circuit that converts the input voltage switched by the first switching element into an output voltage to output the output voltage to the output terminal;
   a switching control circuit that controls switching operation of the first switching element, and has an OFF mode for stopping the switching operation in response to a signal input to an OFF terminal of the switching control circuit;
   a first rectifier circuit connected between the input/output conversion circuit and the output terminal;
   a second rectifier circuit connected to the output terminal;
   a flyback transformer having a secondary winding wire whose dot side terminal is connected to the second rectifier circuit;
   a second switching element connected to a dot side terminal of a primary winding wire of the flyback transformer;
   a pulse generator that supplies a pulse signal to a gate terminal of the second switching element;
   a waveform detection circuit that is connected to a first connecting point being a connecting point between the dot side terminal of the primary winding wire of the flyback transformer and the second switching element, and detects a voltage or a current at the first connecting point to output a detection signal to the OFF terminal; and
   a capacitive element that is connected to a connecting point between the output terminal and the second rectifier circuit, and stores energy output from the secondary winding wire of the flyback transformer by a single switching of the second switching element,
   wherein a capacitance value of the capacitive element is set such that the waveform detection circuit is capable of detecting a voltage value difference or a current value difference at the first connecting point by detachment and reattachment of the input terminal of the load device from and to the output terminal, the input terminal being connected to a discharge circuit.

2. The switching power supply device according to claim 1, wherein:
   the output terminal has a GND terminal that outputs a GND voltage serving as reference of the output voltage, and
   a non-dot side terminal of the secondary winding wire of the flyback transformer is connected to the GND terminal.

3. The switching power supply device according to claim 1, wherein a non-dot side terminal of the secondary winding wire of the flyback transformer is connected to a connecting point between the input/output conversion circuit and the first rectifier circuit.

4. The switching power supply device according to claim 1, wherein the discharge circuit is a resistor for power supply adapter connection and detection which is provided in the load device and disposed near the input terminal.

5. The switching power supply device according to claim 1, wherein:
   a connection circuit is provided between the input terminal and the discharge circuit, and
   when the connection circuit disconnects the input terminal and the discharge circuit by a switching power supply device OFF signal generated by the load device, the switching control circuit turns into the OFF mode.

6. A switching power supply device comprising:
   a first switching element to which an input voltage is supplied;
   an output terminal detachable from and reattachable to an input terminal of a load device;
   an input/output conversion circuit that converts the input voltage switched by the first switching element into an output voltage to output the output voltage to the output terminal; and
   a switching control circuit that controls switching operation of the first switching element, and has an OFF mode for stopping the switching operation in response to a signal input to an OFF terminal of the switching control circuit;
   a first rectifier circuit connected between the input/output conversion circuit and the output terminal;
   a forward transformer having a secondary winding wire whose dot side terminal is connected to the output terminal;
   a resistor element connected to a non-dot side terminal of a primary winding wire of the forward transformer;
   a second switching element connected to the resistor element;
   a pulse generator that supplies a pulse signal to a gate terminal of the second switching element; and
   a waveform detection circuit that is connected to a first connecting point being a connecting point between the non-dot side terminal of the primary winding wire of the forward transformer and the resistor element, and detects a voltage or a current at the first connecting point to output a detection signal to the OFF terminal,
   wherein a resistance value of the resistor element is set such that the waveform detection circuit is capable of detecting a voltage value difference or a current value difference at the first connecting point by detachment and reattachment of the input terminal of the load device from and to the output terminal, the input terminal being connected to a capacitive impedance element.

7. The switching power supply device according to claim 6, wherein a non-dot side terminal of the secondary winding wire of the forward transformer is connected to a connecting point between the input/output conversion circuit and the first rectifier circuit.

8. The switching power supply device according to claim 6, wherein:
   a transmission circuit having a rectification function is provided between the output terminal and the dot side terminal of the secondary winding wire of the forward transformer,
   the output terminal has a GND terminal that outputs a GND voltage serving as reference of the output voltage, and
   a non-dot side terminal of the secondary winding wire of the forward transformer is connected to the GND terminal.

9. The switching power supply device according to claim 8, wherein the transmission circuit is capacitance.

10. The switching power supply device according to claim 6, wherein the capacitive impedance element is noise countermeasure capacitance which is provided in the load device and disposed near the input terminal.

11. The switching power supply device according to claim 6, wherein:
   a connection circuit is provided between the input terminal and the capacitive impedance element, and
   when the connection circuit disconnects the input terminal and the capacitive impedance element by a switching power supply device OFF signal generated by the load device, the switching control circuit turns into the OFF mode.

12. The switching power supply device according to claim 2, wherein the discharge circuit is a resistor for power supply adapter connection and detection which is provided in the load device and disposed near the input terminal.

13. The switching power supply device according to claim 3, wherein the discharge circuit is a resistor for power supply adapter connection and detection which is provided in the load device and disposed near the input terminal.

14. The switching power supply device according to claim 2, wherein:
   a connection circuit is provided between the input terminal and the discharge circuit, and
   when the connection circuit disconnects the input terminal and the discharge circuit by a switching power supply device OFF signal generated by the load device, the switching control circuit turns into the OFF mode.

15. The switching power supply device according to claim 3, wherein:
   a connection circuit is provided between the input terminal and the discharge circuit, and
   when the connection circuit disconnects the input terminal and the discharge circuit by a switching power supply device OFF signal generated by the load device, the switching control circuit turns into the OFF mode.

16. The switching power supply device according to claim 7, wherein the capacitive impedance element is noise countermeasure capacitance which is provided in the load device and disposed near the input terminal.

17. The switching power supply device according to claim 8, wherein the capacitive impedance element is noise countermeasure capacitance which is provided in the load device and disposed near the input terminal.

18. The switching power supply device according to claim 7, wherein:
   a connection circuit is provided between the input terminal and the capacitive impedance element, and
   when the connection circuit disconnects the input terminal and the capacitive impedance element by a switching power supply device OFF signal generated by the load device, the switching control circuit turns into in the OFF mode.

19. The switching power supply device according to claim 8, wherein:
   a connection circuit is provided between the input terminal and the capacitive impedance element, and
   when the connection circuit disconnects the input terminal and the capacitive impedance element by a switching power supply device OFF signal generated by the load device, the switching control circuit turns into the OFF mode.

* * * * *